US010823152B2

(12) United States Patent
Roeper et al.

(10) Patent No.: US 10,823,152 B2
(45) Date of Patent: Nov. 3, 2020

(54) WIND TURBINE BLADE DE-ICING SYSTEMS AND METHODS

(71) Applicant: Borealis Wind Inc., Waterloo (CA)

(72) Inventors: Daniela Roeper, Oakville (CA); Dylan James Baxter, Kamloops (CA); Aiden Gabriel Sotres, Vancouver (CA); Jonathan Parkin, Abbotsford (CA)

(73) Assignee: Borealis Wind Inc., Ontario (CA)

( * ) Notice: Subject to any disclaimer, the term of this patent is extended or adjusted under 35 U.S.C. 154(b) by 310 days.

(21) Appl. No.: 16/078,765

(22) PCT Filed: Mar. 2, 2017

(86) PCT No.: PCT/CA2017/050266
§ 371 (c)(1),
(2) Date: Aug. 22, 2018

(87) PCT Pub. No.: WO2017/147698
PCT Pub. Date: Sep. 8, 2017

(65) Prior Publication Data
US 2019/0063407 A1    Feb. 28, 2019

Related U.S. Application Data

(60) Provisional application No. 62/301,832, filed on Mar. 1, 2016.

(51) Int. Cl.
*F03D 80/40* (2016.01)

(52) U.S. Cl.
CPC ........ *F03D 80/40* (2016.05); *F05B 2270/301* (2013.01); *F05B 2280/6001* (2013.01); *Y02E 10/42* (2013.01)

(58) Field of Classification Search
CPC ......... F03D 80/40; B64D 15/00; B64D 15/02; B64D 15/04; F24F 13/0218; F24F 11/72
See application file for complete search history.

(56) References Cited

U.S. PATENT DOCUMENTS

| 2,576,487 | A |   | 11/1951 | Stanley |   |
|---|---|---|---|---|---|
| 2,804,095 | A | * | 8/1957 | Schauenburg | E21F 1/04 138/107 |

(Continued)

FOREIGN PATENT DOCUMENTS

| CA | 2017420 | 11/1990 |
|---|---|---|
| CA | 2669337 | 5/2008 |

(Continued)

OTHER PUBLICATIONS

Federal Corporation Information for Borealis Wind from Corporations Canada (Year: 2020).*

(Continued)

*Primary Examiner* — Michael Lebentritt
*Assistant Examiner* — Topaz L. Elliott
(74) *Attorney, Agent, or Firm* — Own Innovation; James W. Hinton

(57) ABSTRACT

There is a system and method for de-icing a wind turbine blade. The system includes a heater for heating air and for attaching to an interior surface of the wind turbine blade, a blower for moving air across the heater to generate a heated airflow, and a flexible duct for receiving the heated airflow and for releasing the heated airflow into the interior of the wind turbine blade. The method includes generating heated air in the interior of a wind turbine blade, moving the heated air into a porous duct within the interior of the wind turbine blade, and passing the heated air through the porous duct and into the interior of the wind turbine blade to heat a surface of the wind turbine blade.

19 Claims, 16 Drawing Sheets

(56) References Cited

U.S. PATENT DOCUMENTS

| | | | |
|---|---|---|---|
| 4,254,821 A | | 3/1981 | Matsuda et al. |
| 5,137,057 A | | 8/1992 | Hummert |
| 9,169,830 B2 | * | 10/2015 | Weitkamp .............. F03D 1/0683 |
| 9,528,442 B2 | * | 12/2016 | Trinh ....................... F02C 7/047 |
| 10,458,396 B2 | * | 10/2019 | Philipsen ................ F03D 80/40 |
| 2011/0182735 A1 | | 7/2011 | Kodama |
| 2013/0101414 A1 | * | 4/2013 | Weitkamp ............... F03D 80/40 |
| | | | 416/1 |
| 2015/0176490 A1 | * | 6/2015 | Trinh ...................... B64D 15/02 |
| | | | 244/134 R |
| 2017/0254316 A1 | * | 9/2017 | Philipsen ................ F03D 80/40 |
| 2017/0260969 A1 | * | 9/2017 | Zhao ...................... F03D 1/0675 |

FOREIGN PATENT DOCUMENTS

| | | | | |
|---|---|---|---|---|
| CA | 2856899 | A1 | | 10/2011 |
| CA | 2740103 | A1 | | 11/2011 |
| CA | 2933215 | | | 11/2011 |
| CA | 2859625 | A1 | | 6/2013 |
| CA | 2861580 | A1 | | 7/2013 |
| CA | 2839736 | A1 | | 7/2014 |
| CA | 2900118 | | | 9/2014 |
| CA | 2914727 | | | 12/2014 |
| CA | 2793281 | C | | 2/2015 |
| CA | 2959567 | | | 3/2016 |
| CA | 2701223 | C | | 5/2016 |
| CN | 1727673 | A | | 2/2006 |
| CN | 202181995 | U | | 4/2012 |
| CN | 202194784 | U | | 4/2012 |
| CN | 102748243 | | | 10/2012 |
| CN | 102748243 | A | * | 10/2012 |
| CN | 102748243 | A | | 10/2012 |
| CN | 1727673 | B | | 12/2012 |
| CN | 202673585 | U | | 1/2013 |
| CN | 102939505 | A | | 2/2013 |
| CN | 203130361 | U | | 8/2013 |
| CN | 203452981 | U | | 2/2014 |
| CN | 104995403 | A | | 10/2015 |
| CN | 205036516 | U | | 2/2016 |
| CN | 104160147 | B | | 3/2017 |
| DE | 19621485 | | | 3/1998 |
| KR | 20130025677 | A | | 3/2013 |
| WO | WO-03058063 | A1 | * | 7/2003 ............. F03D 80/40 |
| WO | WO-2006114491 | A1 | * | 11/2006 ................ F24F 7/06 |
| WO | 2013091642 | A1 | | 6/2013 |
| WO | 2015048974 | A1 | | 4/2015 |

OTHER PUBLICATIONS

Canadian Intellectual Property Office as International Searching Authority, International Search Report and Written Opinion for PCT/CA2017/050266, dated Sep. 28, 2017.

Barnes, "Baby, It's Cold Outside", downloaded from http://www.windsystemsmag.com/media/issues/2017/201710/1017-InFocus.pdf, Oct. 14, 2017.

Albers, "Summary of a Technical Validation of ENERCON's Rotor Blade De-Icing System", Deutsche WindGuard Consulting GmbH, Sep. 2011.

Enercon, "WINDBLATT", Enercon Magazine for Wind Energy, Jan. 2011.

European Patent Office, Extended European Search Report for EP Patent App. No. 17759037.9, dated Sep. 6, 2019.

Ilinca, "Analysis and Mitigation of Icing Effects on Wind Turbines", Wind Turbines, Apr. 2011, pp. 177-214.

Karthäuser et al., "Deicing of Wind Turbines using Microwave Technology", Winterwind 2015, Feb. 2015.

Nordex, "Anti-Icing Higher Yields in Cold Climates", downloaded from www.nordex-online.com/fileadmin/MEDIA/Produktinfos/EN/Nordex_Anti-Icing_en.pdf, May 1, 2015.

Parent, et al., "Anti-icing and de-icing techniques for wind turbines: Critical review", Cold Regions Science and Technology 65, Jan. 2011, pp. 88-96, vol. 65, Issue 1.

Shajiee et al., "Development of a Novel Ice Sensing and Active De-icing Method for Wind Turbines", 50th AIAA Aerospace Sciences Meeting including the New Horizons Forum and Aerospace Exposition, Jan. 2012.

Suke, "Analysis of Heating Systems to Mitigate Ice Accretion on Wind Turbine Blaes", McMaster University, Jan. 2014.

Vestas Wind Systems A/S, "Vestas De-Icing System", 2013.

China National Intellectual Property Administration, Office Action dated Jun. 24, 2002 for Chinese Patent Application No. 201780014522.9, and English translation.

* cited by examiner

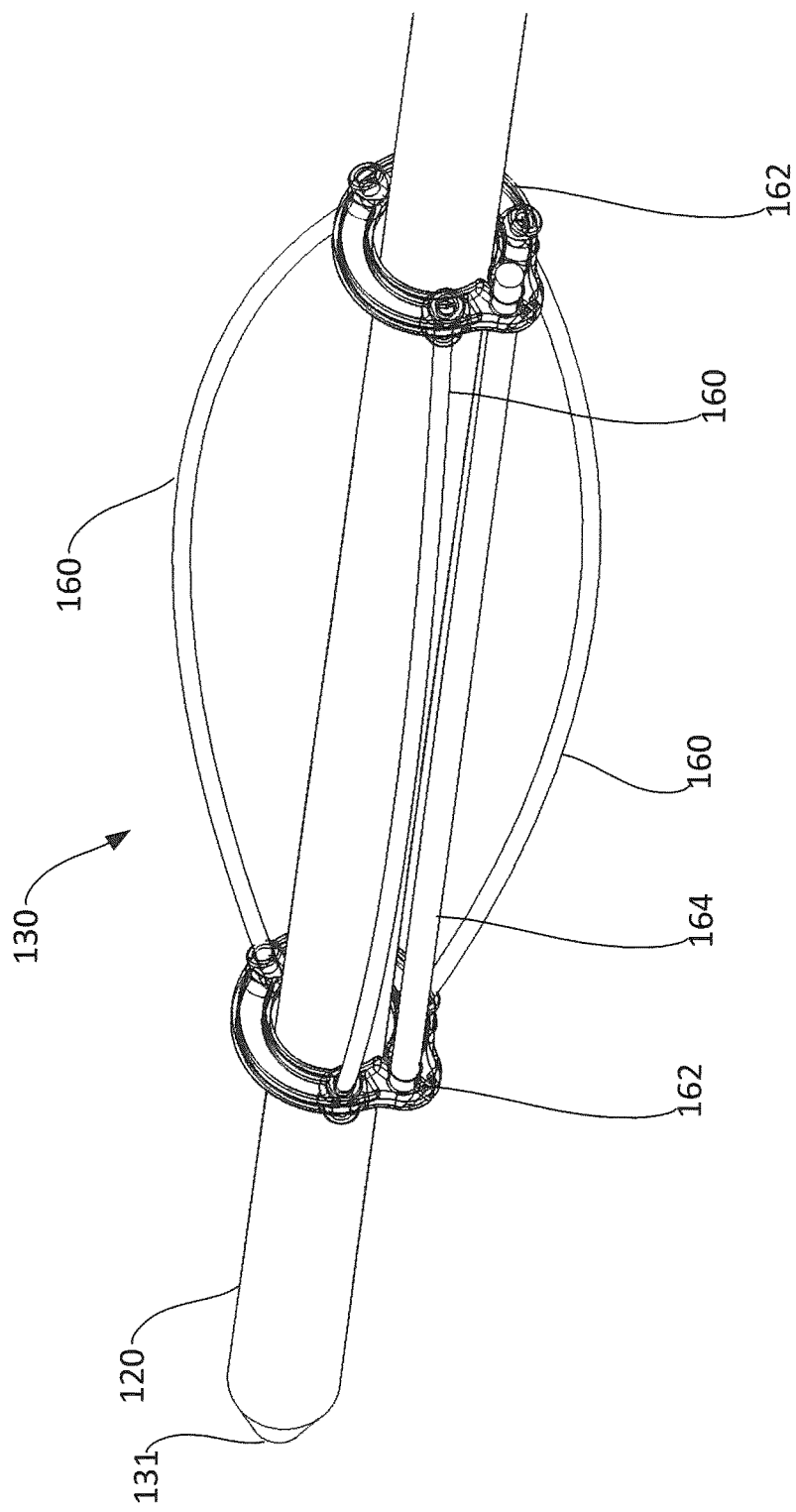

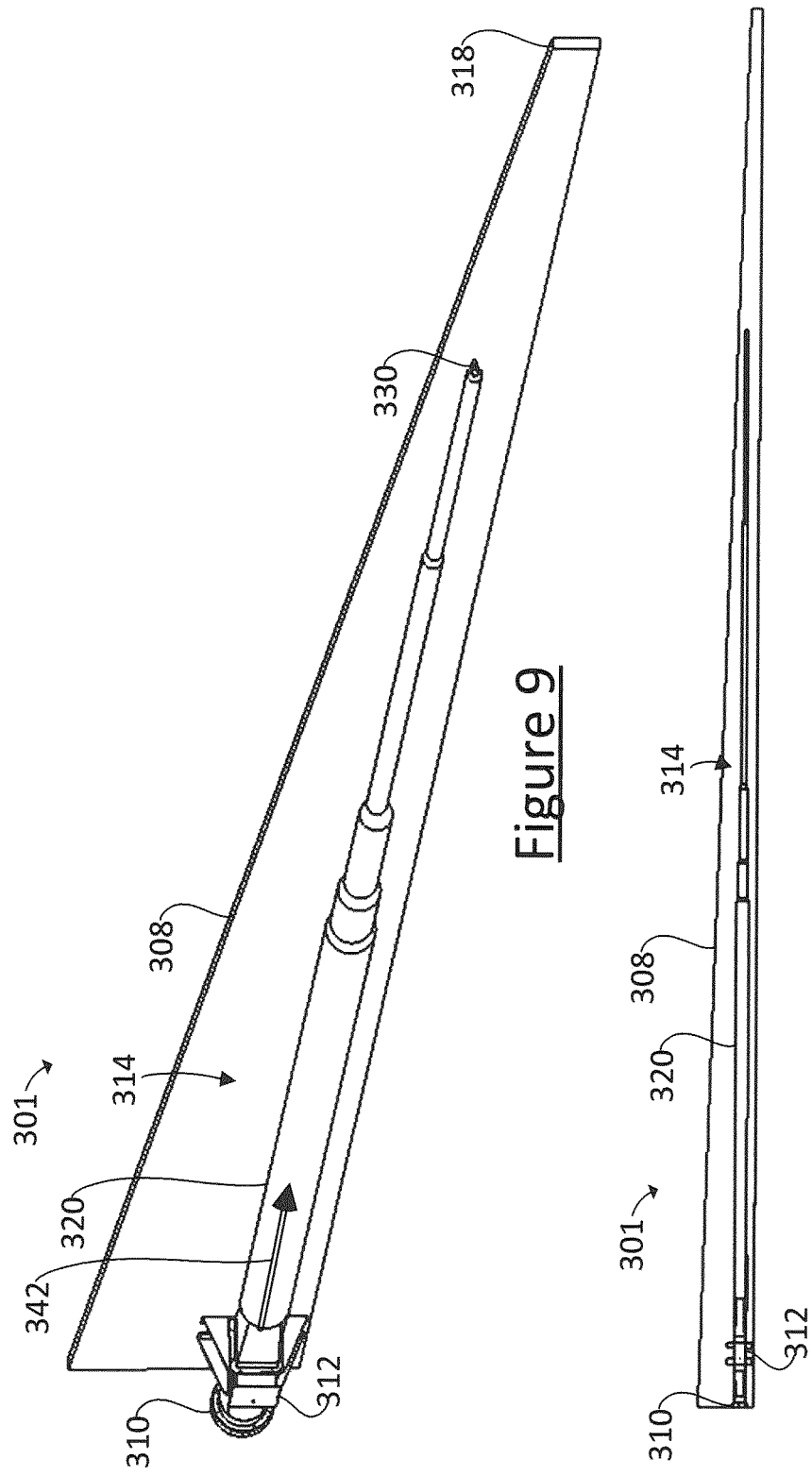

WIND TURBINE BLADE DE-ICING SYSTEMS AND METHODS

TECHNICAL FIELD

The disclosure herein relates to wind turbines, and in particular to systems and methods for de-icing wind turbine blades.

BACKGROUND

Wind resources for wind energy production may be located in cold wet regions where ice may form on a blade of a wind turbine. Wind turbine blade icing may cause several problems for the operation of the wind turbine such as measurement error, prolonged power loss, mechanical failure, and safety hazards. Based on the profile of the blade, a critical area of icing occurs on the most distal third of the blade along the leading edge. The most distal third of the blade has the highest relative velocity and is therefore more likely to have ice buildup. Accordingly, it may be desirable to have a wind turbine blade de-icing system.

Conventional de-icing systems may include external coatings and paints. Further, while there may be certain conventional de-icing systems, they are often directly built into the blade during the manufacturing process of the blade. A retrofit of an existing blade involves parameters such as energy, effect of additional mass of the system, and difficulty and cost of installation (as a retrofit). For example, these parameters indicate that a device embedded within the fiberglass layers of the wind turbine blade may be an unsuitable for retrofit for an existing wind turbine. Further, installation costs are a factor to be considered for externally installed devices. Fluids and machines on the blade may alter the dynamics of the system, especially as mass moves closer to the tip. Adding a de-icing system to the exterior of the blade may result in losses in power generation due to changes in aerodynamic properties of the blade that may outweigh benefits of recaptured power after icing events. Additionally, the external de-icing systems are exposed to harsh environmental conditions and air erosion, requiring frequent maintenance to maintain effectiveness.

Looking to the aviation industry, wing anti-icing and de-icing has been considered over the past century. Methods for wing anti-icing and de-icing may include hot bleed air circulation, pneumatic boots, and the use of anti-freeze sprays (e.g. ethylene glycol spray). Ethylene-glycol spray may be used on airplane wings. However, ethylene glycol spray does not de-ice, it only prevents ice formation, and only for a limited time period (e.g. 15 minutes) which would work for the aviation industry as the anti-freeze will provide just enough time for the airplane to reach the upper atmosphere where icing is less severe. As such, an anti-freeze system would likely be continuously supplied and may not practical or sustainable in wind turbine applications.

Pneumatic boots use inflatable rubber strips on the leading edge of the blade. These methods offer different alternatives to shedding ice without the energy-demanding method of providing heat to the iced regions. Although pneumatic boots may be successfully employed in the aviation industry, they are not perfect and fail to satisfy some of the specifications of wind turbines. In the aviation industry, the hot air systems are used as anti-icing systems and not as de-icing systems because the losses due to convection are significant at high air-speeds. Conventional systems may fall short due to exceeding the available electrical energy capacity. Additionally, conventional systems either cannot be installed or are extremely costly to implement as a retrofit.

Therefore it may be desirable to have an improved wind turbine blade de-icing system that may provide a retrofit to existing blades.

SUMMARY

According to one aspect, there is provided a system for heating a wind turbine blade. The system includes a heater for heating air and for attaching to an interior surface of the wind turbine blade, a blower for moving air across the heater to generate a heated airflow, and a flexible duct for receiving the heated airflow and for releasing the heated airflow into the interior of the wind turbine blade.

In an embodiment of the system, the flexible duct includes a porous fabric duct. In an embodiment, the flexible duct includes a non-porous duct for receiving the heated airflow and passing it to the porous fabric duct. In an embodiment of the system, as the heated air flows, the porous fabric duct reduces in size and the non-porous duct does not reduce in size. In an embodiment of the system, the flexible duct is self-inflating.

In an embodiment of the system, the system includes a spine for connecting to and supporting the flexible duct. In an embodiment of the system, the interior surface of the wind turbine blade includes a spar, and the spine is attached to the spar.

In an embodiment of the system, the system includes a tip constraint for supporting a distal end of the flexible duct without attaching to the interior surface of the wind turbine blade. In an embodiment of the system, the tip constraint includes a pair of tip constraint flanges for circumferentially supporting the flexible duct, and bowing rods affixed at each end to the tip constraint flanges so as to be friction fit with the interior surface of the wind turbine blade.

In an embodiment of the system, the system includes a nozzle attached to the distal end of the flexible duct for passing air to a tip of the wind turbine blade.

In an embodiment of the system, the system includes a temperature sensor for sensing an air temperature of interior of the wind turbine blade. In an embodiment, the system includes a control system for adjusting the heater and blower output based on the sensed air temperature.

According to another aspect, there is provided a method for heating an interior of a wind turbine blade that includes installing any one of the systems provided above into a wind turbine blade.

According to another aspect, there is provided a wind turbine blade that includes any one of the systems provided above.

According to another aspect, there is provided a wind turbine that includes the wind turbine blade provided above.

According to another aspect, there is provided a method for heating an interior of a wind turbine blade, the method including generating heated air in the interior of a wind turbine blade, moving the heated air into a porous duct within the interior of the wind turbine blade, and passing the heated air through the porous duct and into the interior of the wind turbine blade to heat a surface of the wind turbine blade.

In an embodiment, the method for heating the interior of a wind turbine blade includes melting ice on an exterior surface of the wind turbine blade.

In an embodiment, the method for heating the interior of a wind turbine blade includes heating a leading edge surface of the wind turbine blade.

In an embodiment, the method for heating the interior of a wind turbine blade includes sensing a temperature of the wind turbine blade and adjusting the generated heated air based on the sensed temperature.

In an embodiment, the method for heating the interior of a wind turbine blade includes the steps of sensing a pressure of the wind turbine blade and adjusting the generated heated air based on the sensed pressure. According to one aspect, there is provided a system for de-icing a wind turbine blade. The system includes a blower mounted to an interior surface at the base of the blade for moving air; a heater mounted at the base of the blade interior and coupled to the blower for heating the air; and a flexible duct mounted at the base of the blade interior and coupled to the heater for receiving the heated air; wherein the heated air passes through the flexible duct and into the interior of the blade to heat the interior of the blade to melt ice on the blade exterior. The flexible duct extends proximal to the tip of the blade to deliver the heated air to the critical icing area.

In an embodiment, the flexible duct is made of fabric. In an embodiment, the flexible duct is supported by a spine. In an embodiment, the internal surface of the blade comprises a spar or shear web, and one end of the spine is fixed to the spar or shear web. In an embodiment, the heating system is mounted so that it is heating the leading-edge cavity of the blade. In an embodiment, the heating assembly further comprises at least one sensor for measuring a temperature of the blade, and a control system for adjusting the amount and temperature of the hot air that passes into the cavity based on the temperature of the blade. The control system may also determine when the de-icing system is activated (turned on) and deactivated (turned off). In an embodiment, the heater is attached to the flexible duct by a flange.

According to another aspect, there is provided a method for heating the interior of a wind turbine blade to melt ice on the blade. The method includes heating air, moving the heated air, and passing the heated air through a flexible duct into the interior of a turbine blade. In an embodiment, the amount and temperature of the heated air is adjusted in accordance with a temperature of the wind turbine blade.

According to another aspect, there is provided a wind turbine blade with an installed heating assembly. The heating assembly includes a blower that moves air; a heat source for attaching to the wind turbine and for generating heated air; and a flexible duct for receiving the heated air attached to an internal surface of the blade; wherein the heated air passes through the duct and into the interior of the blade to heat the interior of the blade to melt ice on the blade.

Other aspects and features will become apparent, to those ordinarily skilled in the art, upon review of the following description of some exemplary embodiments.

BRIEF DESCRIPTION OF THE DRAWINGS

Some embodiments of the present specification will now be described, by way of example only, with reference to the following drawings, in which:

FIG. 8A illustrates a perspective view of a tip constraint installed on a flexible duct of the de-icing system of FIGS. 5A-B;

FIGS. 9 to 14 illustrate a perspective view, a side view, a close up view, an exploded view, a duct view, and an end view, respectively, of a de-icing system, in accordance with an further embodiment.

DETAILED DESCRIPTION

The various embodiments described herein generally relate to methods and systems for de-icing a wind turbine blade.

Figure 1:
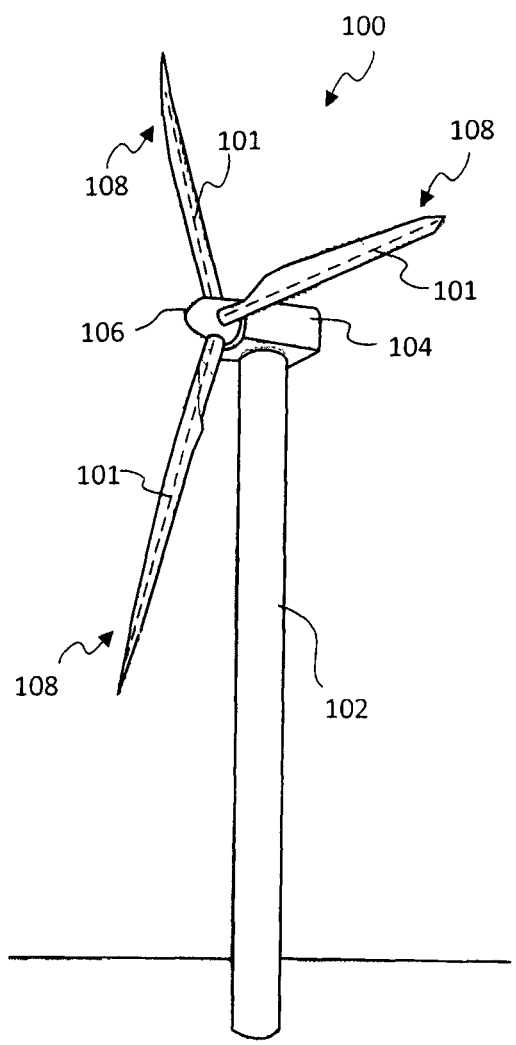
FIG. 1 illustrates a perspective view of a wind turbine, in accordance with an embodiment.

Referring to FIG. 1, illustrated therein is a wind turbine 100 having a de-icing system 101 according to an embodiment. As shown in FIG. 1, the wind turbine 100 includes, a tower 102, a nacelle 104, a hub (main shaft portion) 106, and blades 108. The tower 102 is installed so as to extend vertically upward from the ground. The nacelle 104 is rotatably disposed on the tower 102, such that it can be turned around in a horizontal plane by a yaw driving apparatus (not shown). A power transmission shaft and an electric power generator (not shown) are disposed inside the nacelle 104. The hub 106, which includes a main shaft portion, is coupled to the power transmission shaft and rotatably provided on the nacelle 104. Multiple (three, in the present embodiment) blades 108 for receiving wind are attached to the hub 106 so as to extend radially at equal angle intervals.

The nacelle 104 holds the main electrical and mechanical components of the wind turbine 100 such as a generator for generating electrical power from the rotational motion, a slip-ring, and a top-box (not shown). There may not be a significant amount of room inside the nacelle 104, which may have from 5 to 7 feet of vertical space. The generator may heat the nacelle 104 during lengthy operation. The generator may include a mechanical brake to ensure that the turbine does not spin during maintenance. The slip-ring may provide electricity to the hub 106 and the blades 108. The slip ring may be mounted to the rear of a mechanical shaft at a distance (e.g. about three feet) from away from the top-box. In a specific embodiment, the slip-ring may have one 3-phase 690V port open. In other embodiments, the slip ring may require an upgrade to be able to accommodate the new wiring for the de-icing system 101. In further embodiments, the slip-ring will vary with the particular wind turbine. The top box may hold the CPU and software for remote control of the de-icing system 101. The nacelle 104 may also have two roof hatches, which provides human access to the hub 106. The roof of the nacelle 104 may not have handrails or walking guides. A large portion of the walk from nacelle 104 roof to the access hole in the hub 106 may be slanted from left-to-right at a 20-30 degree angle, and back-to-front at a 5-10 degree angle.

Access to the hub 106 may be through one of three portholes towards the front nose of the hub 106. At 90 degrees, immediately following this initial porthole may be another porthole allowing human access into the center of the hub 106. This space may be limited to access by two or three people. The hub 106 may not experience latent heat from the generator like the nacelle 104 and as a result may be equipped with electric heaters to keep circuit boards at operable temperatures. The hub 106 may be connected to the blades 108 with an internal gear and pinion system, and this gear may be well greased. The smallest port hole in the entire sequence of actions leading into the blades 108 may occur between the hub 106 and the blade 108.

In an example, human access to the top of the tower 102 may include a tall single ladder (e.g. 80 m). There may be three platforms between the base of the tower 102 and the nacelle 104. There may be a hole (e.g. 3 ft by 3 ft) in each platform, and there may be a winch (e.g. ¼ tonne) for lifting equipment through those holes. The winch may be used (e.g. with two 600 lbs bags) for lifting most small tools. The human access to the wind turbine may vary depending on the model and specifications of the wind turbine.

Manual electric control of the wind turbine 100 may be done through a computer (e.g. GM SCADA) system. The turbines and the top-boxes may be wired for heating tapes which would have been installed during the manufacturing stage. This open connection may be used in some embodiments to turn the de-icing system 101 on and off. The blade 108, hub 106, nacelle 104, and tower 102 may be protected from lightning surge via grounding strips.

Figure 2:
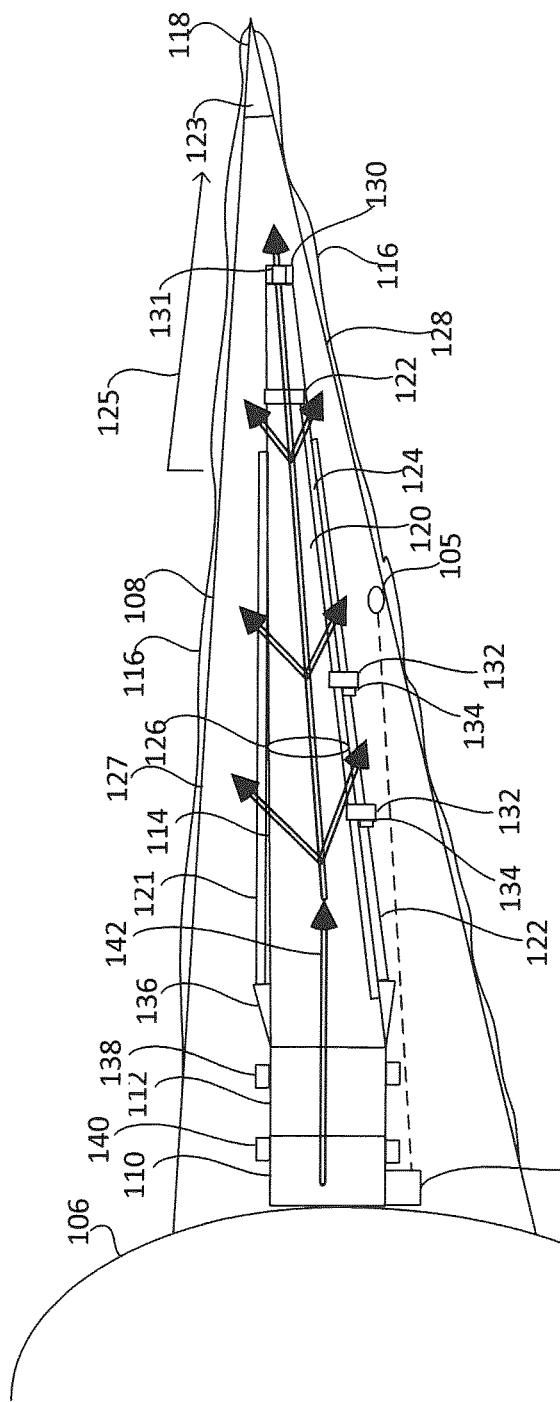
FIG. 2 illustrates a block diagram of a de-icing system, in accordance with an embodiment.
Figure 3:
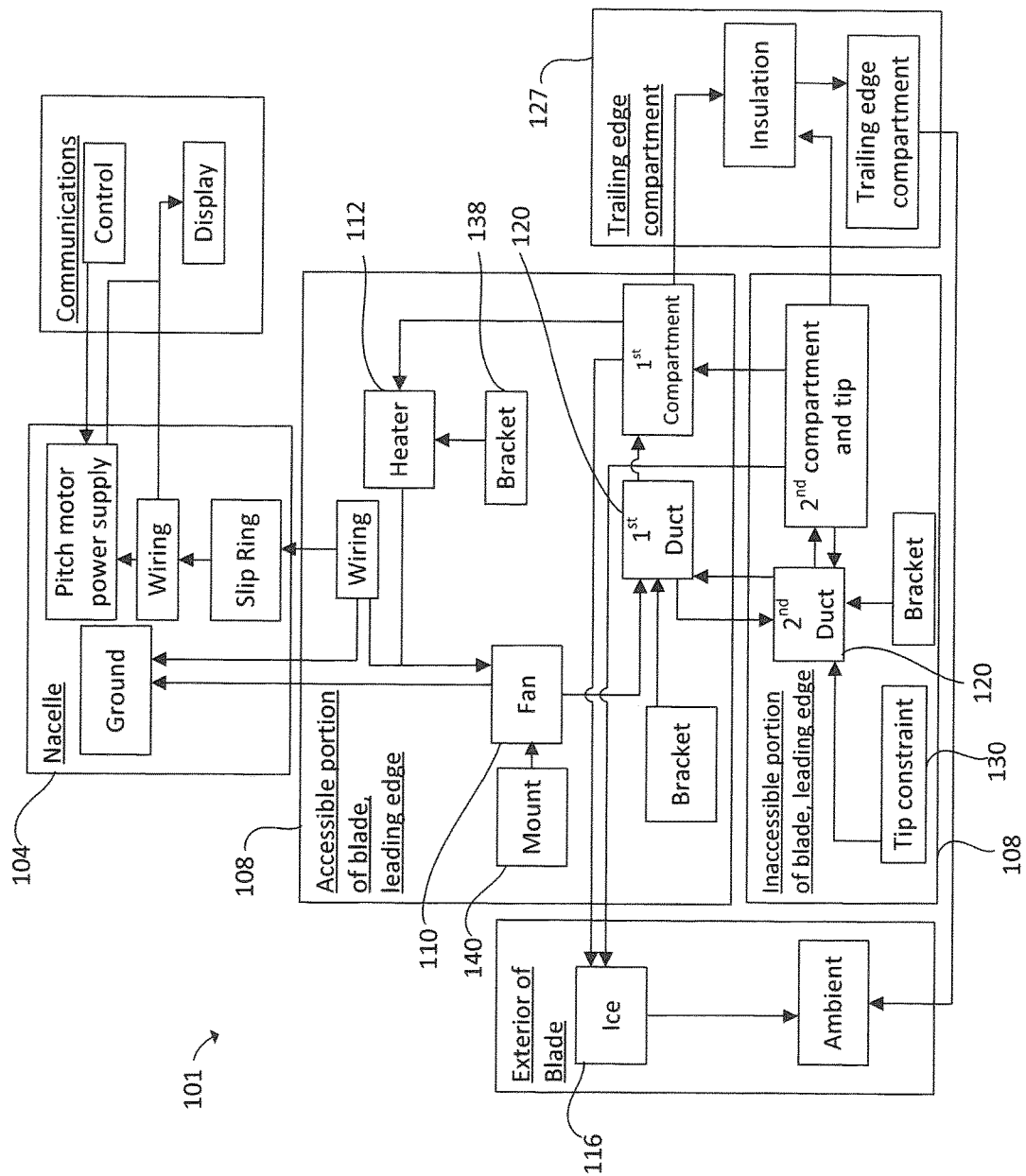
FIG. 3 illustrates a flow chart of a system for de-icing a wind turbine blade, in accordance with an embodiment.

FIG. 2 illustrates the de-icing system 101 (not to scale) for de-icing a wind turbine blade 108, in accordance with an embodiment, FIG. 3 illustrates a flow chart of another embodiment of the de-icing system 101. FIGS. 5-8 illustrate an embodiment of the de-icing system 101. FIGS. 9-14 illustrate a further embodiment of de-icing system 301, where the respective reference numbers are increased by 200 to be in the 3XX series. Each de-icing system 101, 301 shown is installed on an interior surface in the interior cavity of the blade 108 of the wind turbine 100.

Generally, though not necessarily, blades 108 are of a varying thickness. Along the leading edge 128 of the blade 108 there may be a distinct strip which allows light to pass through the surfaces of the blade 108 more than at other places on the blade 108. The surface on the inside of the blade 108 may be unfinished fiberglass. The blade 108 may include a shear web or spar 122 inside the blade 108 made of a balsa or foam core sandwiched between fiberglass. While spar and shear web may be used interchangeably, the system 101 is mounted to the shear web or spar 122 depending if the blade 108 has a shear web or a spar 122.

The blade 108 may include two structural spars: a first trailing edge spar 121 at a trailing edge 127, which is fairly short, and a middle spar 122 near the middle of the blade 108 and running the length of the blade 108. The blade 108 may include a solid segment 123 at about 1 foot from the tip 118 of the blade 108. The blade 108 includes an inaccessible section 125 inside the blade 108 that may become too small for a technician to service the blade 108. For example, where the blade 108 is of 37 m in length, the inaccessible section 125 of the blade 108 may occur at around 15-16 meters at the distal end of the blade 108.

The de-icing system 101 is installed within the enclosed space of the blade 108. The de-icing system 101 may use three heat transfer mechanisms: conduction, convection, and radiation. Convective heat transfer includes moving heated air from a heater along the blade 108, decreasing the internal volume using insulation, moving fluid through ducting systems, where different fluids have been considered, and positioning heaters throughout the blade 108. Conductive heat transfer includes applying resistive elements on the blade 108 surface, applying friction on the blade 108 surface, and applying heat pipes conveying different fluids. Radiation heat transfer includes using microwaves or infrared waves to heat the surface of the blade 108. The de-icing system 101 may also make use of vibrations in the form of ultrasonics.

The de-icing system 101 includes a blower 110 that pushes air across one or more heaters 112. The heater 112 may include resistive elements to heat the air driven by the blower 110 to create heated air. The heated airflow is pushed through a ducting system 114 inside each blade 108. The ducting system 114 releases heated airflow into the blade 108 at specific points down the blade 108. The blower 110 may also control the amount of waste heat lingering around the heater 112. The de-icing system 101 may minimize the number of components that are farther away from the hub 106 down each wind turbine blade 108 (which may make maintenance difficult). The de-icing system 101 may minimize the number of electrical and moving pieces.

The system 101 is fit entirely within the blade 108, and not on the outside of the blade 108. Advantageously, the system 101 is protected from the harsh environment and functional elements external to the blade 108 and may need less maintenance.

The de-icing system 101 may operate once the wind turbine has shut down due to ice 116 forming on the blade 108 or due to an operator's instructions. The de-icing system 101 may also be remotely turned on. The de-icing system 101 may also be controlled by an automatic control system that operates the de-icing system when it senses, e.g., that the blade 108 is below a certain temperature, or that a certain amount of ice has accumulated on the blade 108. In some embodiments, the de-icing system 101 may be persistently operational, but with varying parameters of operation depending on the sensed properties of blade 108. The heater 112 and blower 110 may force hot air to the tip 118 of the blade 108 through the ducting system 114 while the de-icing system 101 is operational. The heater 112 may operate until the blade 108 has shed the ice 116.

The de-icing system 101 may be designed to be installed as a retrofit for existing wind turbine blades 108. The system 101 may be a simple installation, with each component being sized and shaped to fit into the blade without taking the blades down with a crane.

The ducting system 114 may extend as far as possible to the tip 118 of the blade 108. The ducting system 114 may extend to the point where the internal area in the blade cavity shrinks to a minimum area, such as 300 cm². Generally, where the ducting system 114 ends in the blade 108, the air circulation ends, resulting in pressurization. Pressurization may entail very little convective heat transfer. Because the main form of heat transfer may be convection, it is advantageous for air circulation to reach the tip 118 of the blade 108. The heater 112 and blower 110 alone without the ducting system 114 may not be enough to promote circulation of air to the tip 118.

The ducting system 114 may include a flexible duct 120. The flexible duct 120 may be a porous fabric duct. The porosity of the fabric may be chosen based on desired flow characteristics. For example, the porosity of the fabric may be chosen so as to maintain a certain pressure and velocity profile along the length of duct 120. For example, the porosity of the fabric may be 40 (±5%) $m^3/m^2/h$ at 120 Pa. In some embodiments, parts of the flexible duct 120 may be non-porous while other parts of are porous. For example, the part of the flexible duct 120 leaving the heater 112 may be non-porous, while another part of the flexible duct 120 farther down the blade 108 may be porous.

The flexible duct 120 includes a porous fabric duct. The flexible duct 120 further includes a non-porous duct for receiving the heated airflow and passing it to the porous fabric duct. The non-porous duct may also be a fabric duct. As the heated air flows, the porous fabric duct reduces in size and the non-porous duct does not reduce in size to the distal end of the air turbine blade 108.

The flexible duct 120 may be self-inflating. The term "self-inflating" here used to mean that the flexible duct 120 may be supported by internal pressure provided by, e.g., the blower 110.

The fabric duct 120 may be supported by a spine 124. The spine 124 may be cantilevered past the inaccessible point in the blade 108. The spine 124 may keep the flexible duct 120 from contacting the walls of the blade 108. In some embodiments, the spine 124 keeps the fabric duct 120 from collapsing upon itself when the blades 108 are stopped (e.g. where the blade 108 is in an upright position). In other embodiments, the fabric duct 120 may not be supported by a spine, and may be self-supporting (e.g. by a duct spine 124), or supported by other means. The fabric duct 120 may further be rigidly connected to the spar 122 of the wind turbine until roughly halfway (e.g., 15 m, in some cases) into the blade 108, after which the fabric duct 120 may be self-supported by, e.g., a duct spine 124. The spine 124 may have an additional support located at the end of the duct, where the support stops the spine from moving side to side.

The flexible duct 120 may contain one or more circumferential supports 126. The circumferential supports 126 may be integrated into the flexible duct 120. The flexible duct 120 may be made of plastic (e.g. polyurethane). The spine 124 may have a tip constraint 130 for the tip 118 of the blade 108 in order to provide additional support for the flexible duct 120. This may be advantageous where the flexible duct 120 is made of heavier materials. This tip constraint 130 may function like a bottle cork, being wedged into the tip 118 of the blade 108 to help support load of the flexible duct 120. In other embodiments, the tip constraint 130 may prevent or lessen noise caused by the flexible duct 120 striking the inside surfaces of blade 108 while the blade 108 is in motion. The supports for the flexible duct 120 at the tip 118 of the blade 108 may prevent the end of the flexible duct 120 falling out of place. The tip constraint 130 device is fixed to support the ducting system 114 from collapse and damaging the inside of the blade 108 or other components of the de-icing system 101. In other embodiments, the flexible duct 120 may not have any support at the tip 118 of the blade 108. For example, where the tip 118 of the wind turbine blade 108 is closed, the de-icing system 101 may not include the tip constraint 130.

In an embodiment, canvas walls (not shown) may be installed within the blade 108 cavity to divide the cavity into input and output air streams (to promote air circulation). The ducting system 114 may include a telescoping duct that is selectively deployed to extend into the tip 118 of the blade 108 when the blade 108 is stationary. The ducting system 114 may include an inflatable curtain installed to divide the blade 108 cavity into input and output air streams to promote air circulation.

The flexible duct 120 may begin towards the hub 106 and extend to the inaccessible section 125 (e.g., 7 meters) before the tip 118 of the blade 108.

The flexible duct 120 may begin at a first diameter (e.g., of 315 mm) and taper down as it extends down the blade 108, to maintain a 50% return area (i.e. for air circulation) within the cavity of the blade 108. At a point in the inaccessible section 125 before the tip 118 of the blade 108, the flexible duct 120 may be 100 mm in diameter. As the flexible duct 120 tapers down, there may be one or more bleed-outs to maintain the air velocity and static pressure in the blade 108 or the fabric may be permeable to allow air to escape and maintain the velocity and static pressure in the blade. In some embodiments, the flexible duct 120 may be larger than 4" in diameter at every point. In some embodiments, the flexible duct 120 may begin at the same size as the diameter of the blower 110. In some embodiments, the flexible duct 120 may leave at least a 50% return area in the cavity of the blade 108.

The flexible duct 120 may further include a nozzle 131 that provides air throw from the end of the flexible duct 120 to the tip 118 of the blade 108. The end of the nozzle 131 may be, e.g., 50 mm in diameter.

The flexible duct 120 may run along the leading edge 128 side of the primary spar 122. The ducting system 114 may include fasteners 132 spaced (e.g., at every 20 inches) in the accessible portion of the blade 108. For example, the fasteners 132 may be clips. The fasteners 132 may be connected to eyebolts 134 fastened in the primary spar 122. In another embodiment, the flexible duct 120 may be completely supported by the spine 124, and the spine 124 may be fed through a longitudinal pleat (not shown) attached to the flexible duct 120, which may have a number of cut-outs along the length of the flexible duct 120. The cut-outs may provide locations for bolting the spine 124 to the primary spar 122. The spine 124 may be bolted to the spar 122 using pipe clamps or loop clamps as fasteners. The pipe clamps or loop clamps may have a silicon coating for increased friction between the clamp and the spine 124, in order to reduce the possibility of the spine 124 slipping relative to the spar 122.

The flexible duct 120 may be supported by the spine 124 past the inaccessible section 125 in the blade 108. The flexible duct 120 connects to the heater 112 via square to circle heater flange 136 and heater flange bracket 137 near the hub 106.

For certain conditions where the pressure outside the flexible duct 120 is atmospheric, the static pressure in the flexible duct 120 may be maintained above 125 Pa and the velocity of air may remain around 7 m/s. The flexible duct 120 may maximize the air throw from the nozzle 131 of the flexible duct 120 by utilizing the full static pressure available from the blower 110.

Where the ducting system 114 includes the circumferential support 126, the ducting system 114 may include additional fasteners 132 that attach the spar 122 to the circumferential support 126. For example, the fasteners 132 may be 4 inch long eyebolts 134 with a shank diameter of ¼ inches and a rated tensile load of 250 lbs.

The heater 112 is selected to provide a temperature increase in the air. The air temperature increase provided by the heater 112 may have a larger effect on the heat transfer through the blade 108 than the air velocity. As air velocity increases, the rate at which hot air is cycled through the blade 108 may increase; however, there may be little effect on the heat transfer through the blade 108. Furthermore, the most icy area of blade 108—the distal third—may be heated primarily by convection, as there may be low airflow 142 in this area; hence, the air temperature increase provided by the heater 112 may be especially important to the heat transfer effected by de-icing system 101 to this area of the blade 108.

In embodiments where 15 kW is available in each blade 108 for the de-icing system 101, the heater 112 may be a 14 kW heater 112, and may operate on 690V AC 3-phase power. The heater 112 may be sized so that it fits into the blade 108, while still maintaining a flow area similar to that of the flexible duct 120. The heater 112 may have a maximum outlet temperature of 70° C., which may be the maximum temperate that will not risk significantly decreasing the strength and/or resilience of the wind turbine blade 108. The maximum outlet temperature may be governed by the types of materials used in the construction of wind turbine blade 108, and may further be governed by a desired safety factor. For example, the maximum outlet temperature may be determined by the maximum temperature before there is a risk of softening the epoxy/resin. The flexible duct 120 may mount onto the heater 112 via custom metal work such as circle heater flange 136 that the flexible duct 120 can be cinched on to.

The heating area of the heater 112 may be 315 mm×315 mm by 235 mm long. The outer dimensions of the heater 112 may be 385 mm×385 mm and 235 mm long. The heater 112 may an over-temperature safety cut off. The housing of the heater 112 may be made from galvanized steel or stainless steel, which is corrosion resistant. The heater 112 may be chosen to be suitable for an environment with moisture and dust.

In some embodiments, the heater 112 may increase the air temperature that passes through it by 15.5° C. There may be a pressure drop of 90 Pa across the heater 112. The temperature of the heating coils in the heater 112 may be around 200-260° C. In an embodiment, a plurality of heaters 112 may provide the desired level of heating.

The heater 112 may be the heaviest component of the de-icing system 101 and may afflict the most stress on the spar 122 and the mounting components. The heater 112 may be supported by brackets 138. The material for the brackets 138 may be chosen to be of a similar material to the heater case to minimize corrosion. The brackets 138 may mesh with the heater 112 case. The brackets 138 may be attached to the spar 122 with bolts. In embodiments where the spar 122 of the blade 108 is 0.079 m thick and the brackets 138 are selected to be 0.00635 m thick, the bolts may be 0.09 m long with 0.005 m nuts and a washer to the "through-side" to the bolt.

In an embodiment, the heater 112 may have two brackets 138 with six 0.011 m holes. The two brackets 138 may be attached to a total of six of these holes using bolts with a 0.01 m diameter and 0.02 m length shank. This length allows enough room to sandwich the 0.00735 m of duct material with a 0.005 m nut. A piece of plywood (not shown) may be placed on the back side of the spar 122 to distribute the load of the bolts on to the spar.

The flexible duct 120 clamps onto the circle heater flange 136, which is parallel to the airflow 142. The heater 112 and blower 110 both have brackets 138, 140 perpendicular to the airflow 142. In an embodiment, the blower bracket 140 include a circular attachment 141 made for the blower 110 having 150 mm flanges parallel to the airflow 142. The de-icing system 101 includes the heater flange bracket 137 and the heater connection bracket 139 on either side of the heater 112, for example at a length of 150 mm. The flexible duct 120 fits over the circle heater flange 136 and is clamped down with one or more cinch straps 144. The circular attachment 141 is attached to the heater connection bracket 139 with a blower-heater connection 143.

In an embodiment, the blower 110 provides static pressure and flow rate to the flexible duct 120, as well as the pressure lost over the heater 112. For example, the blower 110 may be a centrifugal fan or an axial fan. In an embodiment, the pressure and flow rate to the flexible duct 120 are 350 Pa and 2208 m³/h, respectively, and the air velocity in the flexible duct 120 is maintained at 7.87 m/s. In that embodiment, the pressure loss across the heater 112 is 100 Pa, which means at least 450 Pa of static pressure should be produced by the blower 110. At 2208 m³/h (1300 CFM) the blower 110 is able to output a maximum of 450 Pa; therefore the blower 110 must run at maximum capacity to obtain the necessary minimum static pressure. The blower 110 may be 0.91 kW and operate on 690V AC 3-phase.

The flexible duct 120 will mount onto the blower 110 via the circle heater flange 136 that the flexible duct 120 is cinched using the cinch strap 144.

The blower 110 may be selected in conjunction with the flexible duct 120. The blower 110 may be selected so as to use as little power as possible while still providing the air velocity and static pressure, and operating on, e.g., a 690V three-phase power source. The flexible duct 120 may be selected to have, e.g., a 7 m/s air velocity as well as a static pressure of at least 125 Pa. In an embodiment where the output area of the blower 110 is 162 mm×300 mm, the flow rate may be roughly 1300 CFM to maintain the 7 m/s velocity. Due to the pressure drop over the heater 112 and the nozzle 131 at the end of the flexible duct 120 the minimum required static pressure may be at least 215 Pa. In an embodiment, the blower 110 is an centrifugal fan, which is able to provide 450 Pa of static pressure at a volumetric flow rate of 1300 CFM.

The blower 110 is mounted on two blower brackets 140 that can be used to mount it to the spar 122. In some cases, an additional bracket may be required to distribute the load. The blower 110, may weigh less than the heater 112, and may also be located closer to the center of the hub 106. This may result in less gravitational and centrifugal forces on the blower 110 than the heater 112. Nevertheless, the same bolts used to attach the heater 112 bracket to the spar 122 may be used to attach the blower 110 bracket and feet to the spar 122, in order to minimizes the tools used for installation and capitalizes on any economies of scale.

While the blower 110 weighs less than the heater 112, and is subject to less centrifugal force than the heater 112, a thinner blower bracket 140 and smaller distances between bolts may be selected such that similar bolt stresses as those of the heater 112 may result. In these embodiments, the fasteners used to attach the blower 110 bracket may be similar to the bolts used in the heater 112. For example, the fasteners may be sixteen 0.006 m diameter fasteners. In some cases, the brackets and bolting have a factor of safety (e.g., of 50) to limit the possibility of system failure.

The flexible duct 120 may be supported by the spine 124 in the inaccessible section 125 of the blade 108 to inhibit the flexible duct 120 from collapsing in on itself when the blade 108 is in the vertical position. For example, the spine 124 may be a fiberglass rod. The fiberglass rod is inserted into a longitudinal pleat (not shown) running down the length of the flexible duct 120, and attached to the main spar 122 at the last accessible point in the blade 108. The spine 124 may be constructed from 5-foot segments to allow access into the blade 108, and come with quick-change male and female ends to allow for easy installation.

The spine 124 may be inserted into the pleat formed on the top of the duct 120. In an embodiment, the pleat starts at the 5.4 m point and extends to the 30 m point from the base of the blade 108, and into a pocket capped at the end (at 130). The spine 124 may be restricted from moving at the end of the blade using a tip constraint 130. The tip constraint 130 and/or spine 124 will stop the flexible duct 120 from rubbing against the wall of blade 108, causing excess wear, and will stop the flexible duct 120 from folding back on itself.

Referring specifically to FIGS. 8A-E, the tip constraint 130 includes at least one plastic bowing rod 160 affixed to two or more tip constraint flanges 162. Each plastic bowing rod 160 may be bowed out so as to apply friction to the sides of the blade 108. The tip constraint 130 may use this friction in order to affix itself into the decreasing or inaccessible section 125 of blade 108. The tip constraint 130 may be placed toward the distal end of the flexible duct 120, and may be attached to the flexible duct 120 by way of the tip constraint flanges 162. In these embodiments, the tip constraint flanges 162 may also function as circumferential supports 126 for the flexible duct 120.

In other embodiments, the tip constraint 130 may not be attached to the flexible duct 120, but may provide frictional elements on the interior of tip constraint flanges 162, or other means, so as to prevent the flexible duct 120 from slipping through the tip constraint flanges 162. The tip constraint 130 may also include a tip constraint supporting rod 164, for supporting the structure of the tip constraint 130. The tip constraint supporting rod 164 may be part of the spine 124, or it may be a supporting rod independent of the spine 124.

The tip constraint supporting rod 164 may be fastened to the tip constraint flanges 162 by press fit or friction fit, or with, e.g., bolts or other fasteners. The tip constraint flanges 162 may include a slot for receiving the longitudinal pleat that surrounds the tip constraint supporting rod 164.

The plastic bowing rods 160 may fasten to the tip constraint flanges 162 though guiding bores 166 by press fit or friction fit, or with, e.g., bolts or other fasteners. The guiding bores 166 may be angled relative to the tip constraint flange 162, so as to induce the bowing of the plastic bowing rods 160. This may allow the plastic bowing rods 160 to be, initially, straight (but flexible) plastic rods. The plastic bowing rods 160 may be sized—and their corresponding guiding bores 166 spaced about tip constraint flanges 162—such that each plastic bowing rod 160 corresponds to an edge 168 formed by the inner walls of the blade 108. Fitting the plastic bowing rods 160 into one or more of these edges 168 may prevent the tip constraint 130 from significantly rotating within the blade 108 cavity. Fitting the plastic bowing rods 160 into one or more of these edges 168 may also secure the tip constraint 130 to the tip of the blade 118, allowing the tip constraint 130 to provide support to the flexible duct 120 in the inaccessible area 125.

The tip constraint 130 may prevent or mitigate movement of the flexible duct 120, so as to prevent rubbing or excessive contact of the flexible duct 120 with the wall of blade 108. Use of the tip constraint 130 may also reduce noise that might be caused by such contact.

The flexible duct 120 may have approximately 50% area for backflow. The length that the flexible duct 120 reaches down the blade 108 is a function of the total cross section of the flexible duct 120 and the spine 124. The larger the cross section of the spine 124, the larger the blade 108 must be at the end of the flexible duct 120, limiting the maximum distance the flexible duct 120 can reach down the length of the blade 108. As the length down the blade 108 that ice 116 melts is correlated to the length down the blade 108 that the flexible duct 120 reaches, the length of the flexible duct 120 and therefore cross section of the flexible duct 120 and spine 124 may be constrained within certain limits, depending on, e.g., the dimensions of blade 108. In some embodiments, the spine 124 may be no larger than two inches in cross-sectional diameter and the flexible duct 120 may reach approximately 31 meters down the blade 108.

The spine 124 supports the flexible duct 120 when the wind turbine 100 is at a stand-still. During turbine operation, the centrifugal effects will take over and duct collapse and/or entanglement may not be an issue. In some embodiments, the flexible duct 120 may rest on the sides of the blade 108 when the wind turbine 100 is at a standstill. The spine 124 resists vertical compression and allows for safe contact with the sides of the blade 108. In an embodiment, the flexible duct 120 is approximately 8 inches in diameter, or 0.203 meters and 27 m long. The fabric material has a density of 0.300 kg/m2, resulting in an approximate total duct mass of 5 kg, excluding the pleat and zippers. The total duct mass may be 10 kg, including the pleat and zippers. In this embodiment, the spine 124 would have to be selected so as to be able to support this weight when the wind turbine 100 is at a stand-still.

The weight of the spine 124 may be dependent on: the material chosen for spine 124, the length of the spine 124, the cross-section of the spine 124, and the density of the material chosen. The material of the spine 124 should be strong enough to support the weight of itself and the flexible duct 120. The material chosen may have an allowable temperature operating range equal to or greater than that of the operating range of the turbine (−30° C. to 50° C.), may not be flammable or combustible, and may be commercially available in pipes or rods. Desirable qualities for the material may include: being light, in order to minimize any negative effects from its presence; having a high Young's modulus to prevent as much bending and/or buckling as possible; being soft to prevent damage to objects the spine 124 might strike, and being of low cost. The material for the spine 124 may include engineering composites, engineering alloys, and engineering polymers. In an embodiment, the material for the spine 124 is fiberglass with threaded ends to provide for simple installation.

The spine 124 may be constructed so as to fit through the entry points in the nacelle 104 and blade 108 and into the blade 108. In an embodiment, the spine 124 is constructed from segments (e.g., no longer than 5 feet), which may be easily assembled and disassembled to allow the spine 124 to be brought into the blade 108 through the entry points in nacelle 104. For example, the spine 124 may be constructed from segments of fiberglass pipes that are 1" outer diameter, ⅞" inner diameter and are 5 ft long. These pipes may be connected by a larger fiberglass pipe that both pipes are threaded into. These pipes may be sized so as to have a factor of safety of 1.5 against buckling. The amount of metal used for spine 124 may be minimized as to avoid attracting lightning strikes.

In other embodiments, the spine 124 may include fiberglass pipes with metal threaded ends in 5 foot segments. The spine 124 may include either rigid or flexible fiberglass pipes, or some combination thereof. Rigid pipes may be selected for the sake of greater stability in the blade 108. Pipes of a greater diameter may be selected in order to increase the stiffness of spine 124. Foam insulation (not shown) (e.g., of ⅜" thickness) may cover the metal ends to prevent any damage to the blade 108.

The method for installation of de-icing system 101 may be selected so as to decrease failure of the mounts, which in turn may reduce the probability of loss of device performance and damage to the blade 108. For example, the mounting system may have all rigid connection points on the spar 122 of the blade 108, and fasteners may pass through the spar 122 (e.g., nutted bolts accessible on both sides of the spar 122). To install the de-icing system 101, the installer may climb downward into the blade 108 for installation. The installer may drill multiple holes in the spar 122, and then secures the de-icing system 101 to the blade 108.

The spine 124 is connected to the spar 122 at several points along the accessible portion of the spine, at an equal distance between each fastener 132. There may be around 6 to 10 points of attachment depending on the mass of the spine 124 and the geometry of the blade 108. These attachments are placed from the beginning of the spine 124 to the farthest points down the blade 108 which are accessible by the wind turbine system installer. The weight of the flexible duct 120 and the spine 124 depends on the size of rods/pipes used and can range from 10 to 40 kg. The points of attachment may be a loop clamp tightened around the spine 124. The fasteners 132 such as clamps attach to the spine 124 at locations that prevent sliding motion. Sliding motion can potentially rip the flexible duct 120 causing loss of device performance. The clamps may have a silicon coating so as to increase friction and prevent sliding. The clamps may be mounted snug against the female and male ends of the spine 124 that is accessible.

The de-icing system 101 includes an electrical system 103. The electrical system 103 delivers power from the hub 106 to the blade 108. The electrical system 103 includes a remote shut off, protection from electrical surges, protection from lightning strikes to the turbine. The electrical system 103 may be powered by the 15 kW at 690 VAC available per blade 108, and/or the design may be manually controlled by the user or automatically controlled with the control system. The electrical system 103 may include a back-up overheat sensor. The electrical system may be modified to accommodate additional power requirements. For example, the slip ring size may be increased.

The heater 112 is accounted for in the design of the electrical system 103. The de-icing system 101 may be designed so as to supply the heater 112 with power only when the blower 110 is running at the same time.

The de-icing system 101 may maximize the heat added to the inside of the blade 108 while ensuring all components meet access restrictions, and ensuring compatibility between all components. The de-icing system 101 may be implemented with a 690 VAC 3-phase power source (not shown), capable of dissipating power as high as 15 kW or higher depending on the blade size, weight, and able to meet size, weight, and safety specifications. In other embodiments, other power source voltages and wattages may be used. The power source may be a pitch motor. In an embodiment, the 690 VAC pitch motor source may be branched off into the blade 108 in order to provide the native voltage to the components (e.g. the heater 112 and the blower 110) within the blade 108. In this case, the heater 112, blower 110, and any other electrical components would be rated for 690 VAC.

The electrical system 103 may have the heater 112 and the blower 110 connected to the power supply in parallel, such that the heater 112 and blower 110 are both running at 690V and sharing the power drawn from the source.

Current overload protection may be incorporated into the electrical system 103. Both the blower 110 motor and heater 112 may be protected from exposure to high current so as to avoid damage. The blower 110 may include a time-delay fuse for overload protection due to the inductive nature of the blower's AC motor and a blower-motor startup current specification of 3.1 Amps. The fuse may be an IEC 60364 rated for 690 VAC and able to withstand a minimum operating current of 1.23 Amps. The fuse's interrupt rating may to be higher than the maximum supplied current. An example of a fuse which meets these specifications is the Edison™ EDCC Class CC fuse.

The heater 112 may be chosen so as to be unable to put a significant inductive load on the electrical system 103. The Edison™ EDCC fuses may be used with the heater 112 as well. However, a larger ampacity fuse may be selected for heater 112, since in some embodiments, heater 112 may draws more current that the blower 110 draws. For example, a 25 Amp Edison™ EDCC fuse may be used with the heater 112. It may be necessary to upgrade the fuses in the electrical boxes in the hub 106 and nacelle 104, to allow for the increased current draw from the heater 112 and the blower 110, or to upgrade the slip rings' capacity.

The de-icing system 101 may include a sensor system 105. The sensor system 105 may include two integral thermal cutoff sensors to protect against overheating. The first cutoff may activate at 75° C., and reset itself automatically once the temperature decreases into an acceptable range. The second thermal cutoff may activate at 120° C., and may be only manually resettable. The sensor system 105 may also include at least one temperature sensor and/or at least one pressure sensor (not shown) in each blade 108 that will be solely used for the purpose of data collection.

Failure of the overheat sensor within the heater 112 could cause the flexible duct 120 to melt, the heater 112 to fail, or the blade 108 to weaken in the areas surrounding the heater 112. A second overheat sensor would act as a failsafe for the first one.

In other embodiments, the heater 112 may run at a full 14 kW rating indefinitely to inject as much heat energy into the blade 108 as possible.

The sensor system 105 may also measure the performance of the de-icing system 101 within the blade 108. The sensor system 105 provides quantitative numerical data for performance validation. The sensor system 105 includes a data logger (e.g. from Novus™ FieldLogger) with a plurality of resistance temperature detector (RTD) temperature sensors (e.g. RTD PT100 sensors) and pressure sensors. The temperature sensors may have a built-in cold junction compensator. This sensor system 105 is installed in the hub 106 of the wind turbine 100 with the temperature sensors inserted at strategic points within the blade 108. The data acquired will allow a user to analyze the heat distribution within the blade 108 after a de-icing cycle. This post-event analysis will allow for increased understanding of the performance of the de-icing system 101.

The sensor system 105 includes RTDs to measure the temperature of several points within the blade 108 so that post operation thermal analysis may be conducted on the de-icing system 101. The sensor system 105 may be rugged and durable, to endure installation, potentially damaging operational effects, and large temperature fluctuations.

In other embodiments, the sensor system 105 may include thermocouples or thermistors, bimetal sensors, silicon band gap devices, and/or sealed gauge pressure sensors. Thermocouples may have a relative low cost, lack of moving parts, wide temperature range, short response time, and good reputation for repeatability. However thermocouples may have a relatively low accuracy (0.5° C.), a potential for nonlinearity within the de-icing system 101, and a known reference temperature.

In some embodiments, it may be necessary to install the data logger outside the blade 108 cavity in order to allow the sensor system 105 to accurately read the temperature within the blade 108. For example, this may be necessary where the sensor system 105 includes temperature sensors that include thermocouples. Thermocouples may work on the basis of metallic properties as a function of temperature. Thermocouple whose junction and reference temperatures are the same will measure no temperature. For a thermocouple to acquire a reading, the reference temperature should differ from the temperature being measured. The reference temperature sensor may be in the data logger, and for this reason, the data logger selected should not be installed within the blade 108. If this were done, the temperature sensor in the data logger measuring the reference temperature may cause the other temperature sensors to indicate that the inside of the blade 108 is at zero degrees. Thus, installing the data logger outside of the blade 108 cavity allows the sensor system 105 to accurately read the temperature within the blade 108. In these embodiments, the data logger may be mounted within the hub 106.

The data logger may be selected so as to be able to measure temperatures from −240° C. to 1760° C.

The data logger has enough space for three temperature sensors. Where the temperature sensors do not have a built-in cold junction compensator, there may be space in the data logger for a cold junction compensator terminal. Copper/constantan type T thermocouples may be used for this application, since they have a temperature range which encompasses the expected temperatures within the blade 108, and they may be widely available for commercial use.

The data logger may include a cold junction compensator (CJC) mechanism to discern the temperature at each of the temperature sensors. The CJC measure the ambient temperature and then add a temperature sensor's reading to it. This gives thermocouple readings which are absolute temperatures rather than temperatures relative to the ambient temperature around the data logger.

The sensor system 105 may have an integral battery and a sampling rate between, e.g., 1 measurement per ten seconds to 1 measurement per day, and may be selected so as to have a battery life of 10 years. The sensor system 105 may also have an internal storage device for storing data logged by the data logger. Once the data has been logged, the internal storage device may be retrievable from the data logger. The data can then be downloaded from the device using software (e.g. vLog). The software allows conversion and analysis of the data.

In an embodiment, the de-icing system 101 includes an automatic control system. The control system may detect that the turbine has shut down due to icing and initiate de-icing. The control system may also sense when the ice has been shed from the blade and end de-icing. The control system may receive weather conditions from weather sensors or weather sources and determine whether or not to de-ice. The control system may receive data from the sensor system 105. The control system may also receive weather forecast data. In an embodiment, the control system may be integrated into the existing turbine control system such as a supervisory control and data acquisition (SCADA) system. The control system may also regulate the internal blade temperature, as set by the wind farm technicians or set automatically based on weather conditions, with considerations such as not exceeding the maximum safe temperature for the blade 108 (e.g. 70 Celsius).

In an embodiment, the blower 110 has an AC 3-phase motor, which uses the full 0.91 kW to start up, but will operate on less than that. In this embodiment, if the blower 110 is started first—before the heater 112—a higher power heater can be used.

If a further reduction in de-icing time is desired, insulation may be installed on the trailing edge 127 side of the main spar 122, and blocking off airflow 142 from the leading edge 128 side of the main spar 122, to focus the heat on the leading edge 128.

The electrical system 103 may prevent the heater 112 from receiving electricity unless the blower 110 is on, to stop a local buildup of heat at the root of the blade 108 due to insufficient circulation.

In an embodiment, the heater 112 is mounted on the main spar 122 and is connected to the flexible duct 120 mounted on the leading edge 128. By mounting the flexible duct 120 on the leading edge 128, conduction can be used to heat the first half of the blade 108, and convection to heat the second half of the blade 108.

In another embodiment, insulation is sprayed down the wind turbine blade 108 strategically so that the volume of air to be heated is reduced. In this embodiment, there is one heater 112 and blower 110 located at the base of the blade 108. Generally, embodiments with added thermal resistances from insulation and/or the containing of the forced convection within the blade 108 may increase the efficiency of the amount of the heat that flows to the ice 116 as compared to the amount of heat supplied.

Figure 4:
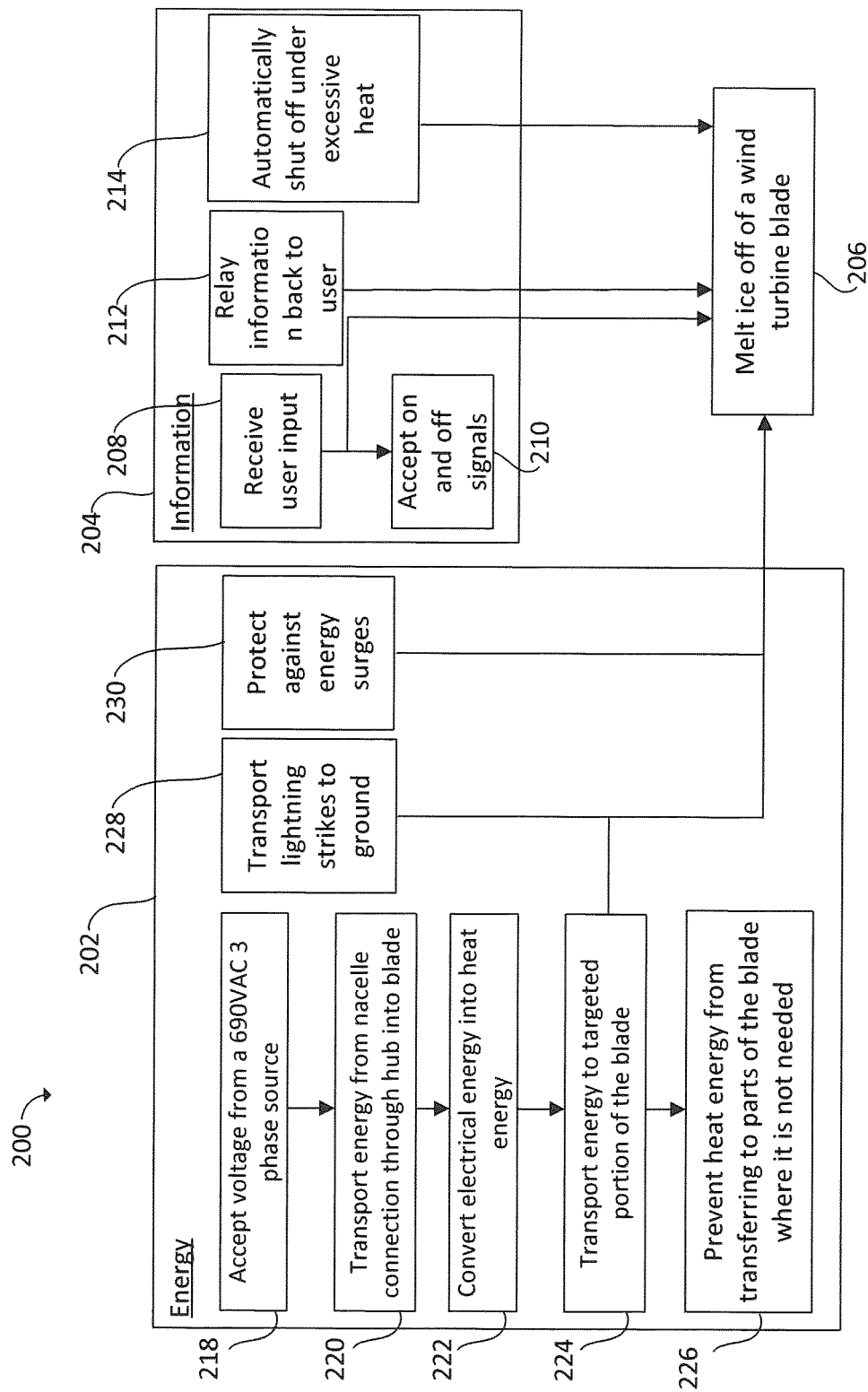
FIG. 4 illustrates a flow chart of a method for de-icing a wind turbine blade, in accordance with an embodiment.
Figure 5A:
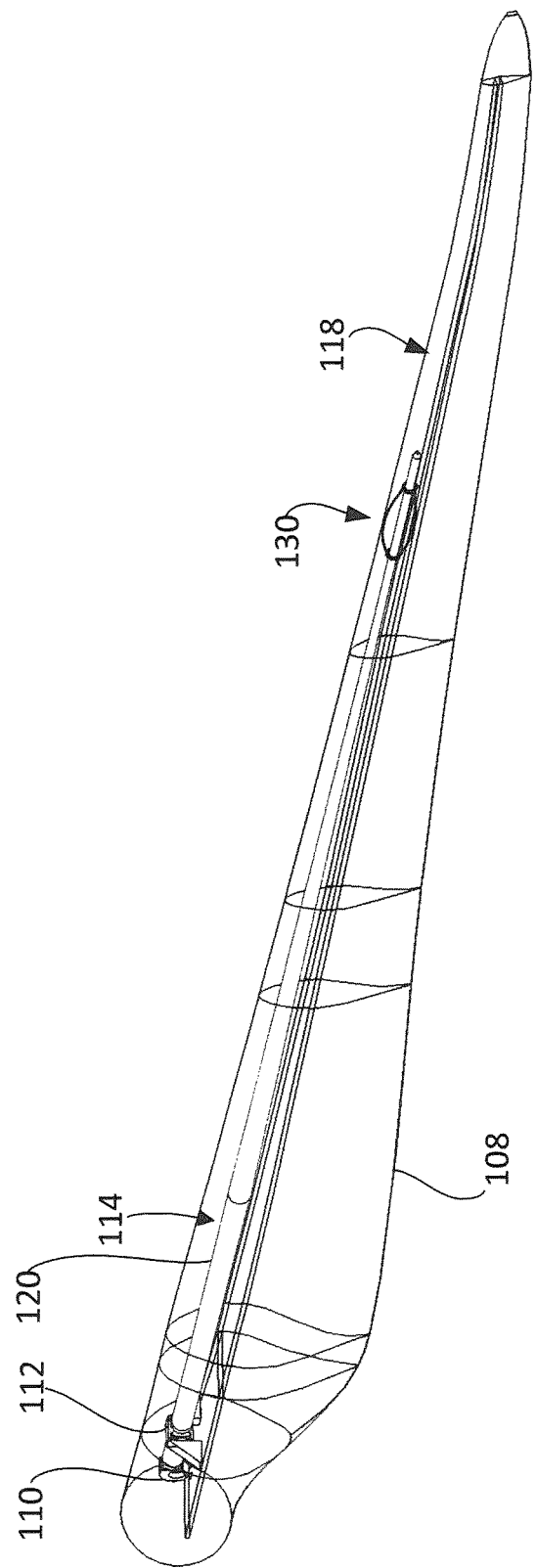
FIGS. 5A and 5B illustrate perspective views of a de-icing system in accordance with an embodiment.
Figure 5B:
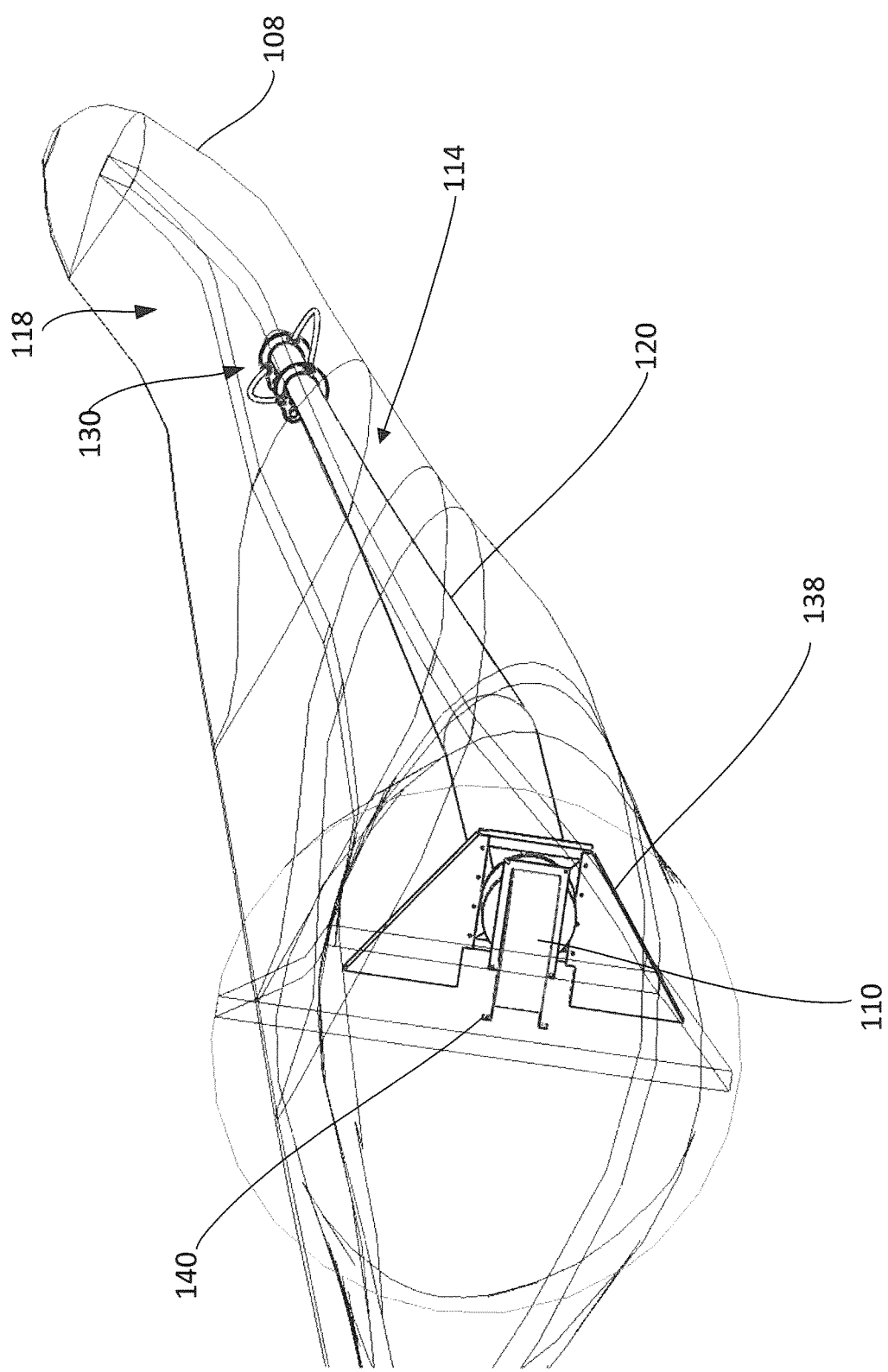
Figure 6A:
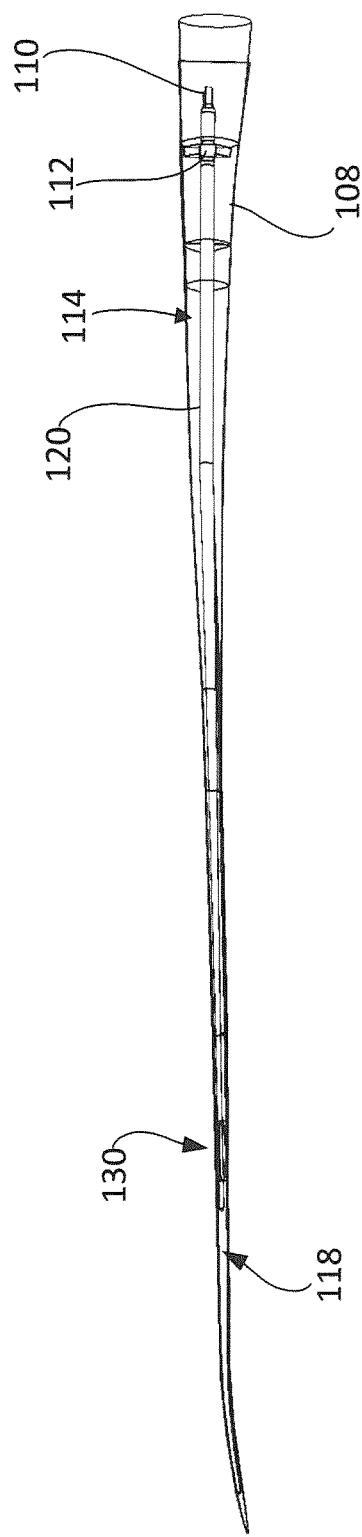
FIGS. 6A and 6B illustrate side views of the de-icing system of FIGS. 5A-B, with FIG. 6B omitting the wind turbine blade for greater clarity.
Figure 6B:
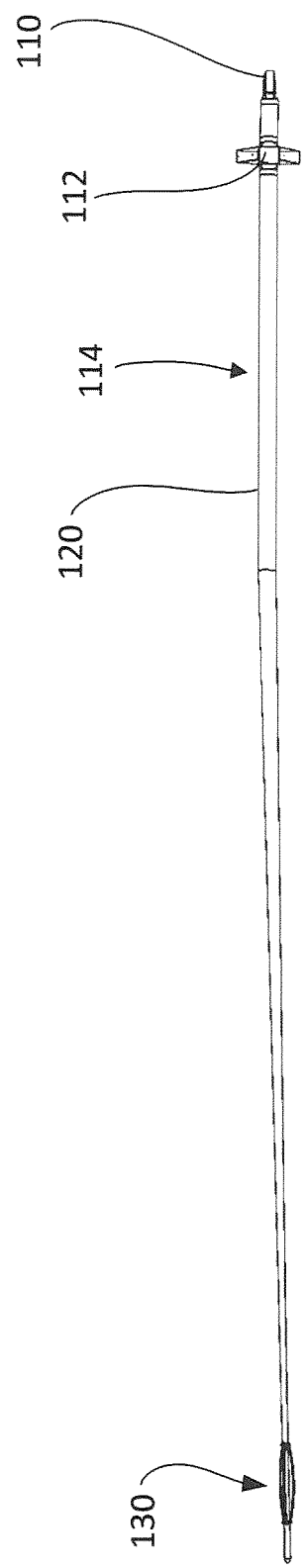
Figure 7:
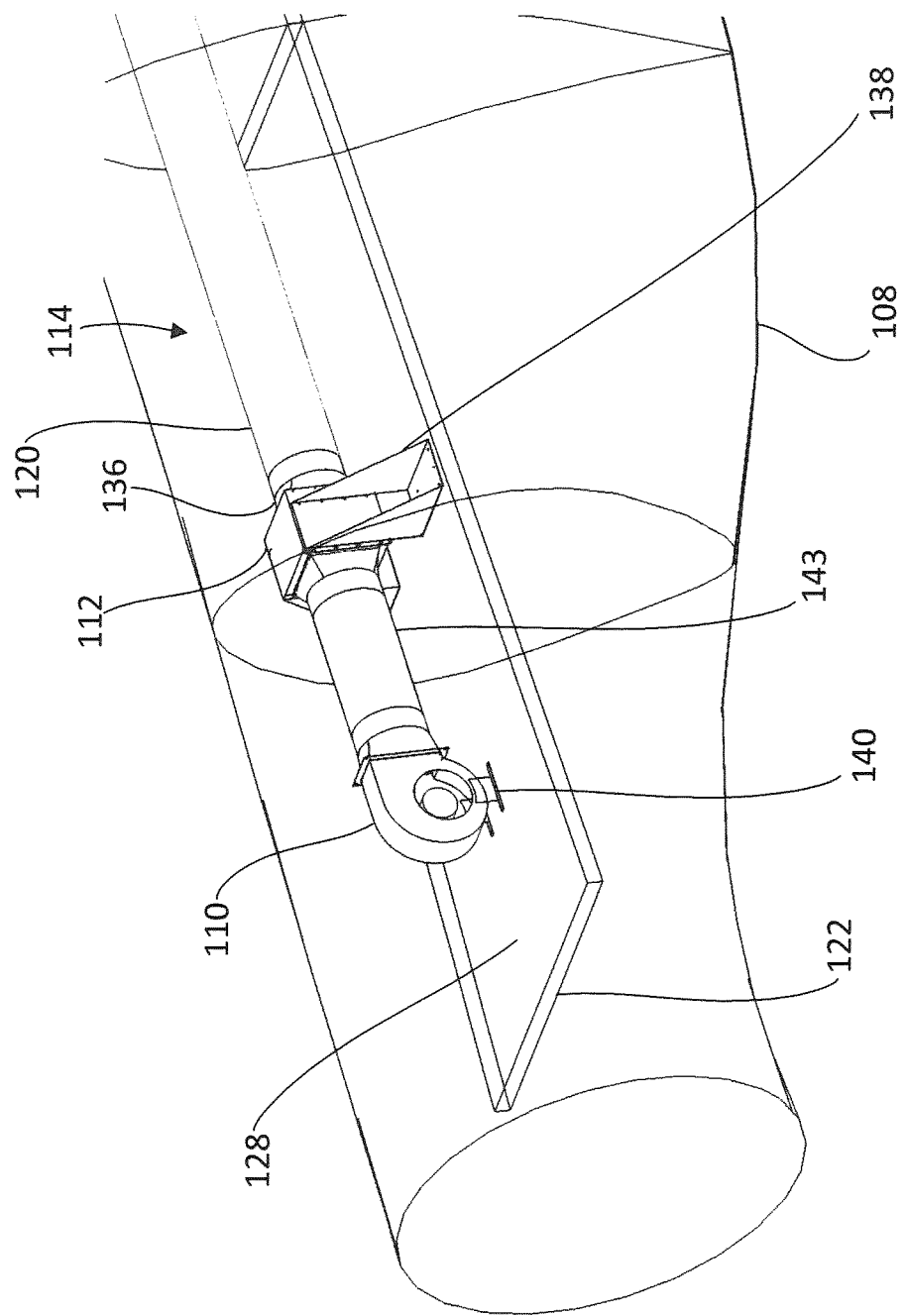
FIG. 7 illustrates a close-up view of the de-icing system of FIGS. 5A-B.
Figure 8B:
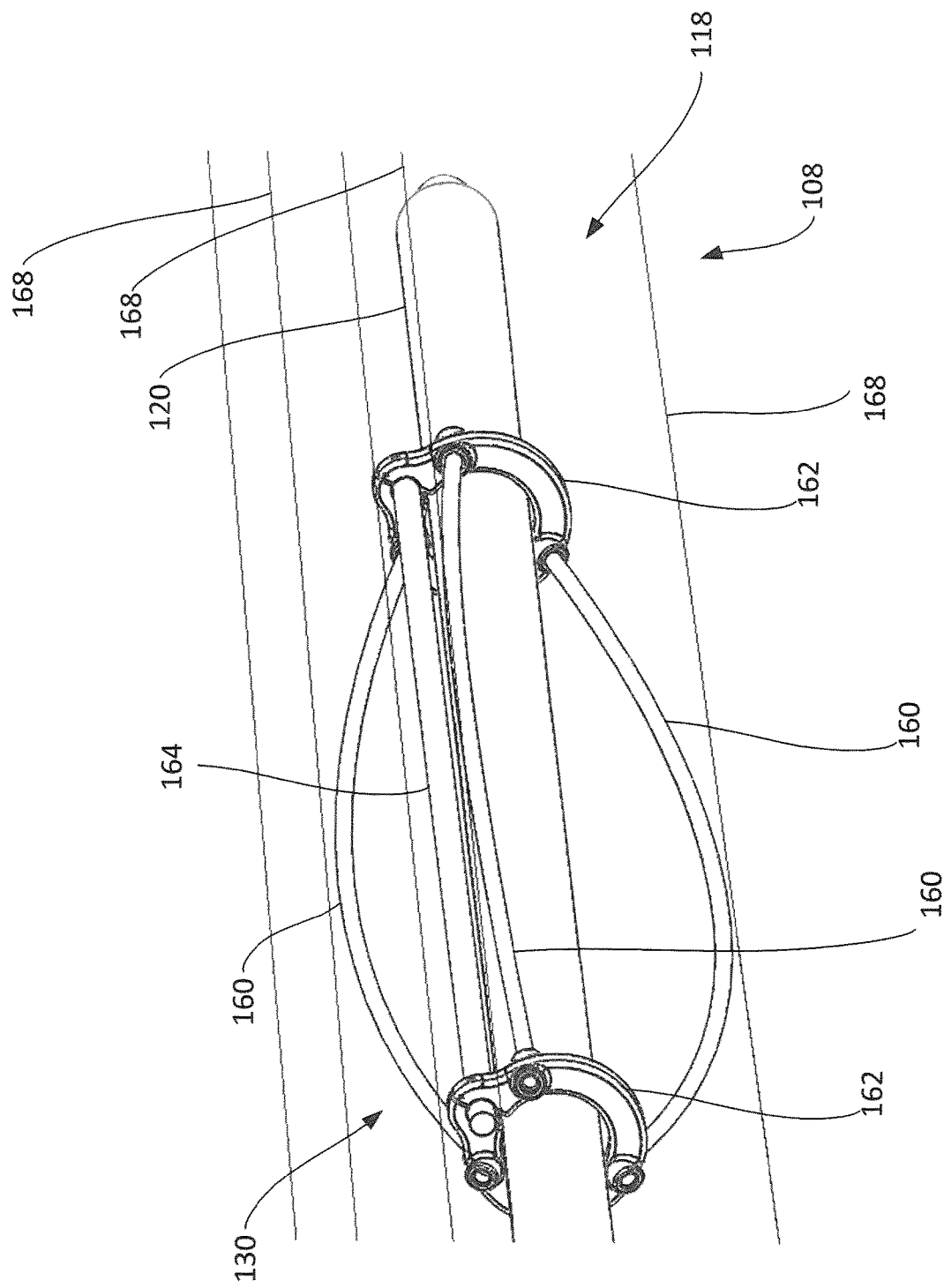
FIG. 8B illustrates a perspective view of a tip constraint installed on a flexible duct of the de-icing system of FIGS. 5A-B inside the wind turbine blade.
Figure 8C:
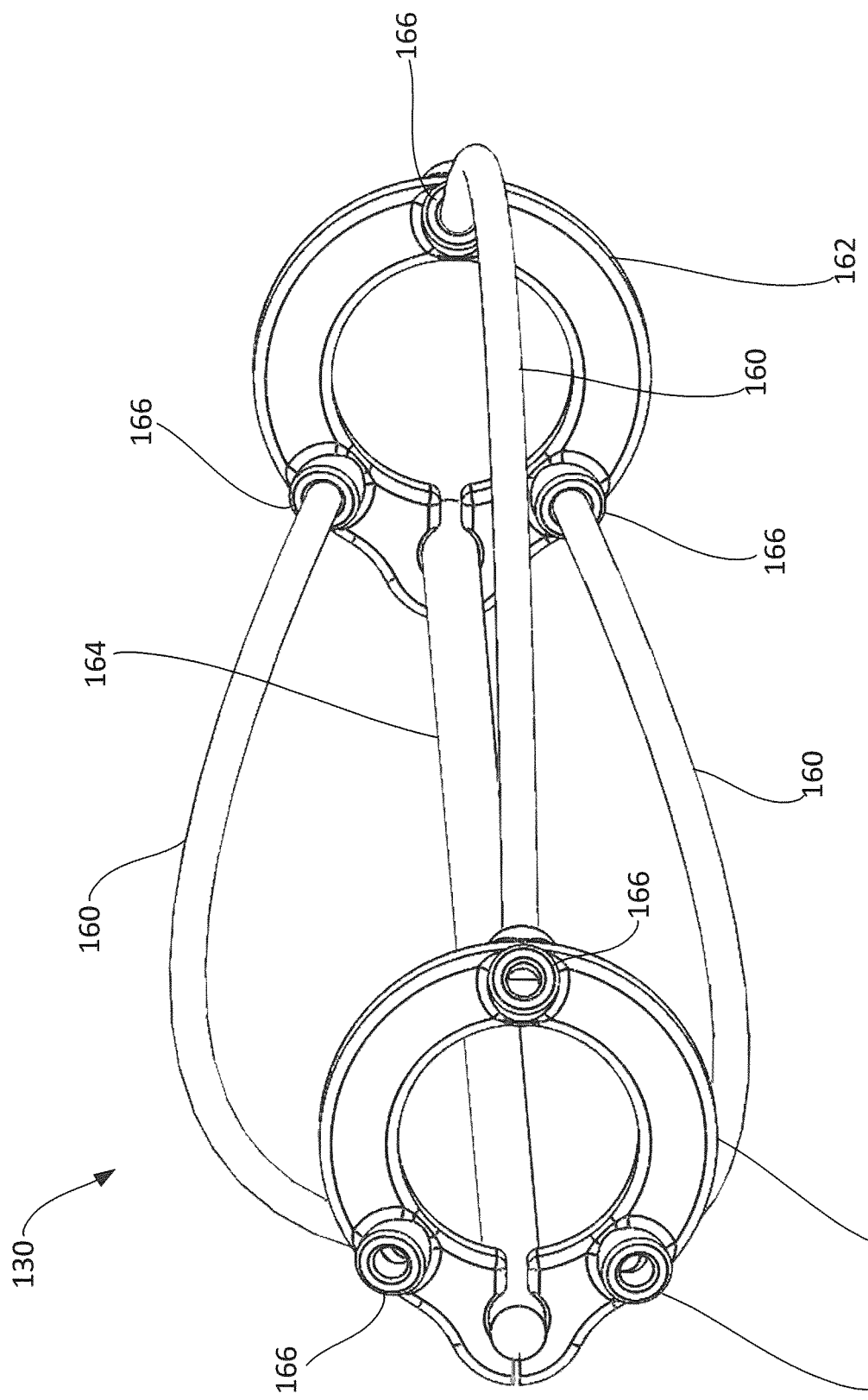
FIGS. 8C-E illustrate a close-up view, end view, and a close-up view of the end of, respectively, the tip constraint.
Figure 8E:
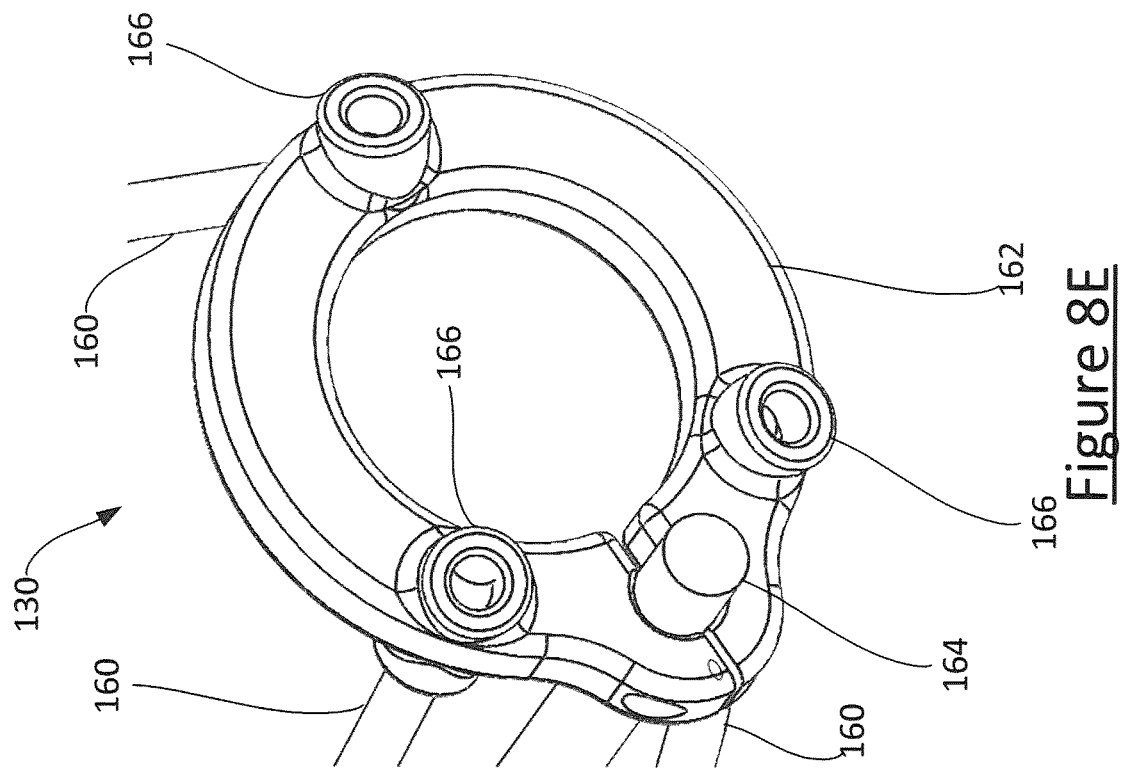
Figure 8D:
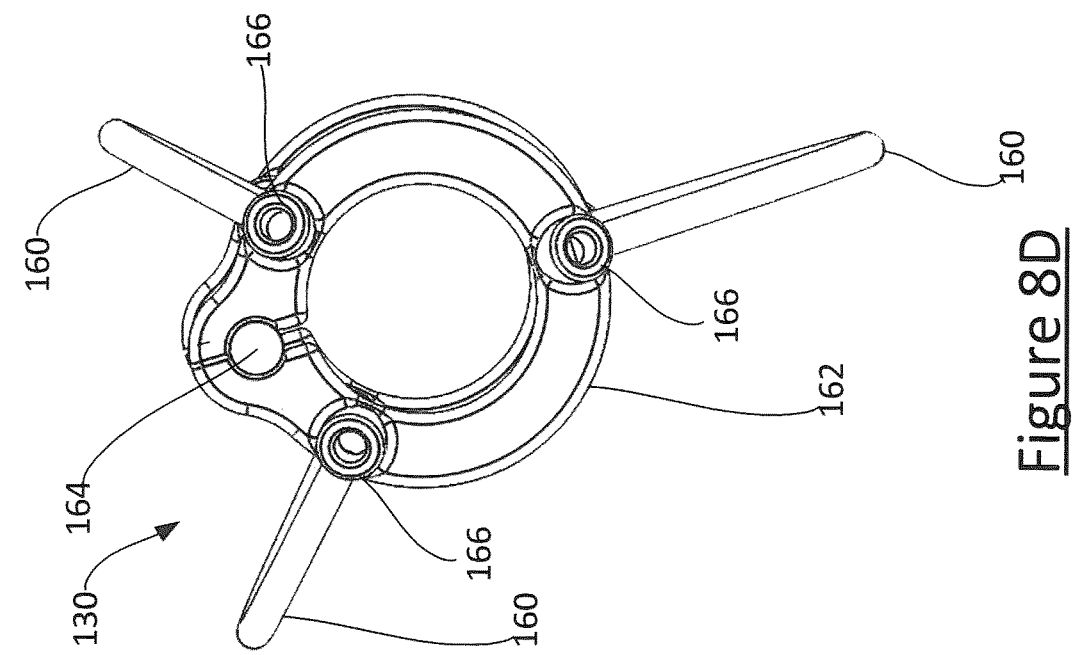
Figure 11:
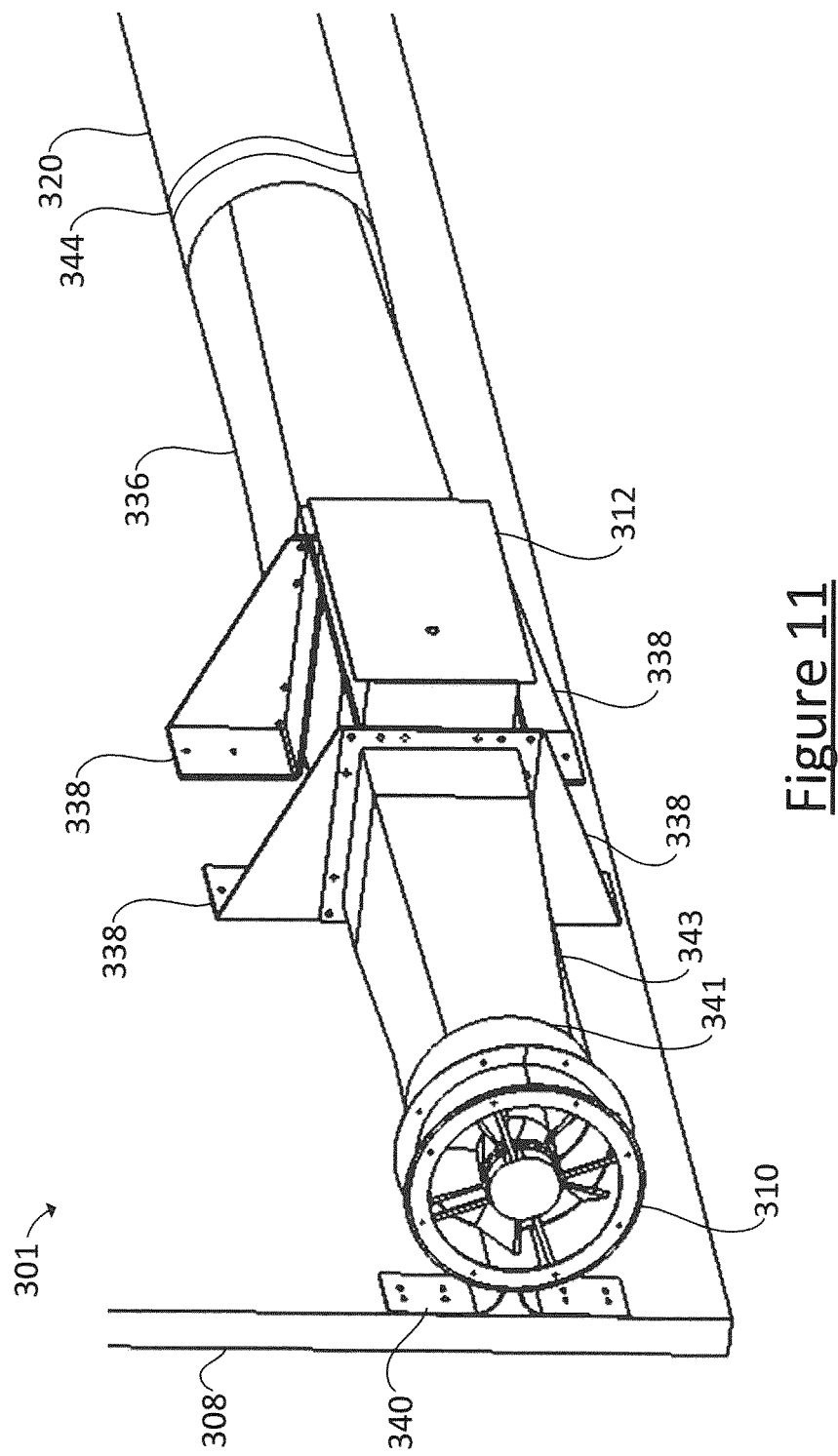
Figure 12:
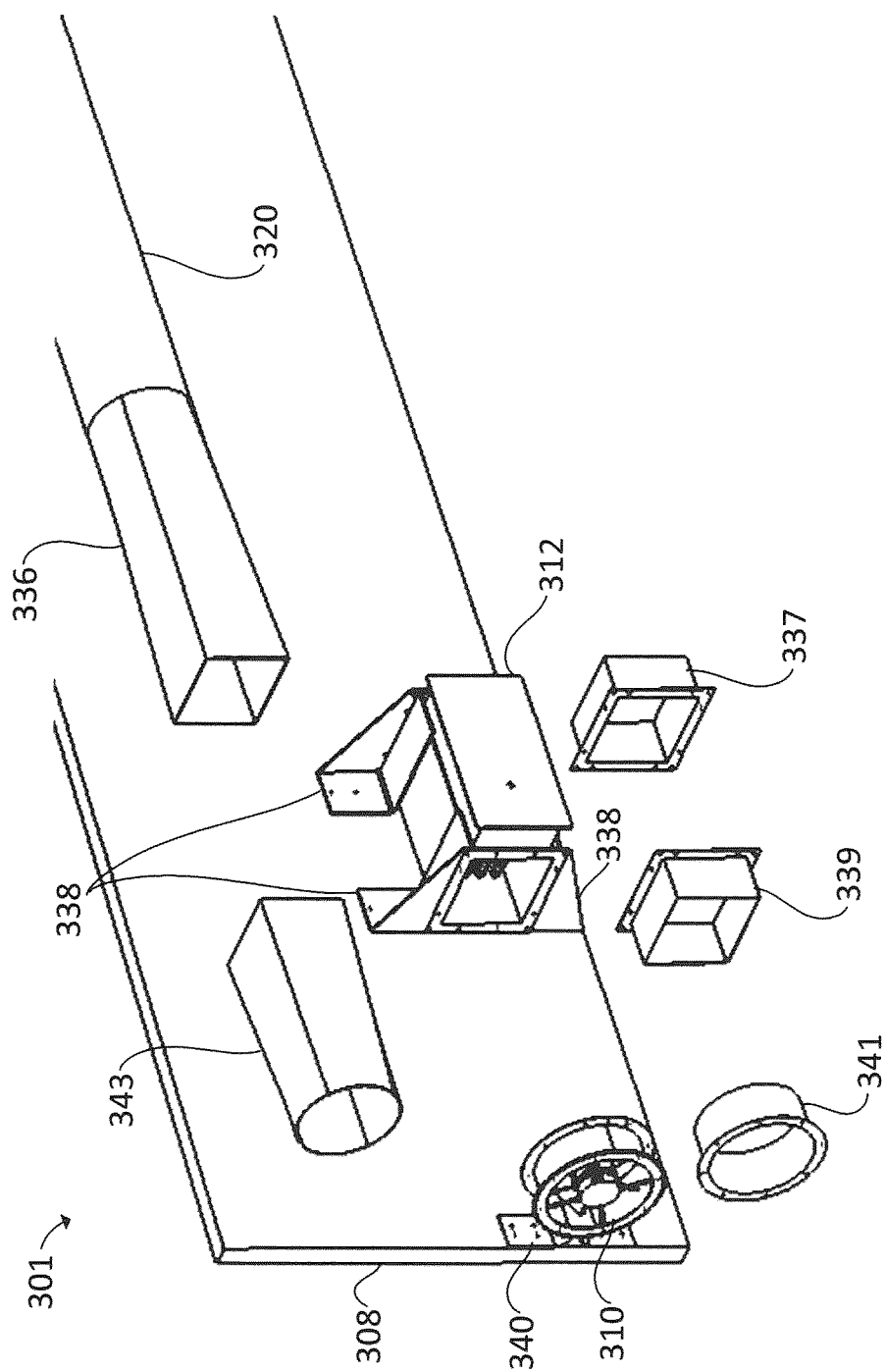
Figures 13, 14:
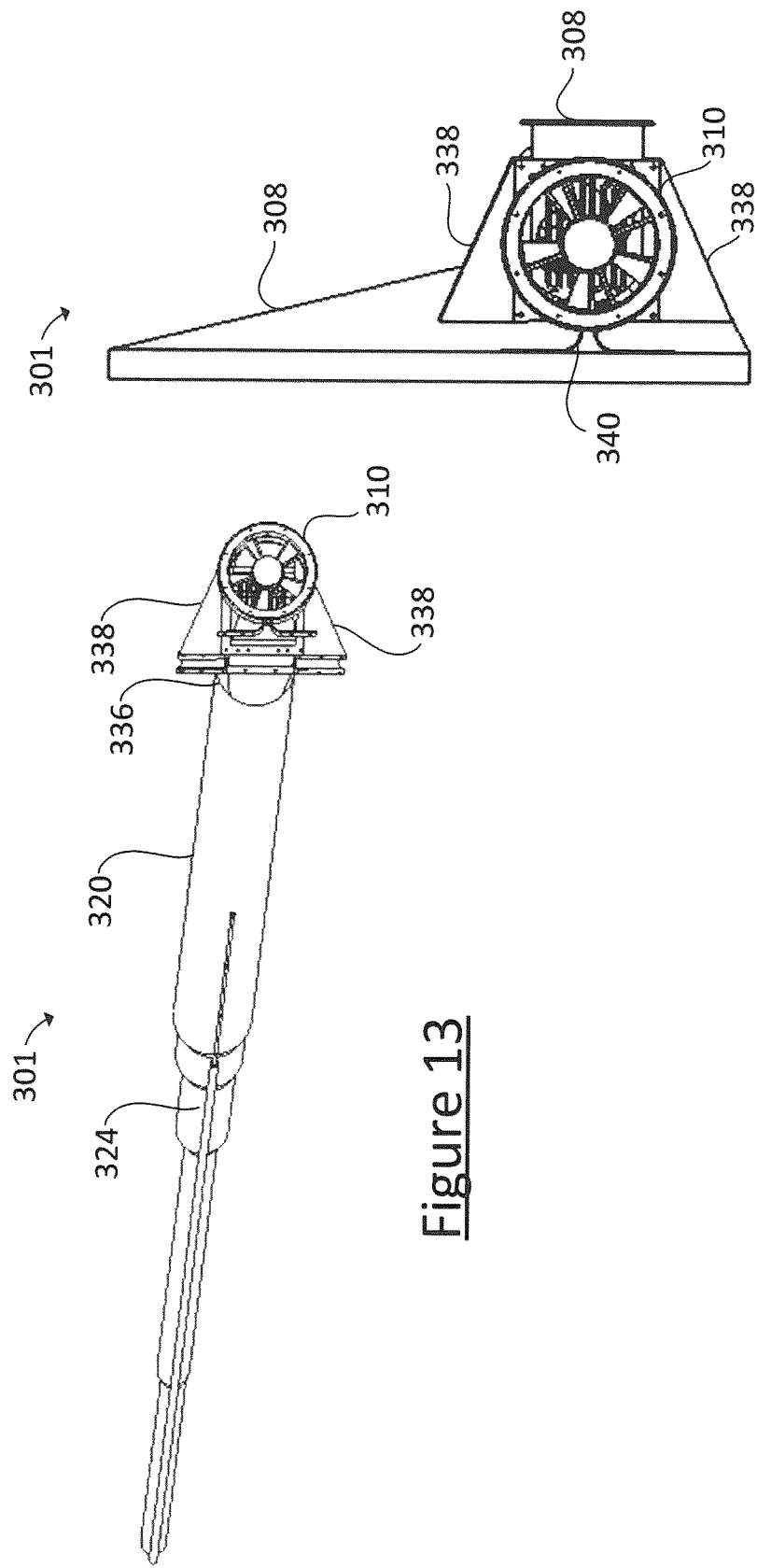

FIG. 4 illustrates a method 200 for de-icing a wind turbine blade 108, in accordance with an embodiment. The method 200 includes an energy component 202 and an information component 204 which combine to melt ice off of a wind turbine blade at 206.

The flow of information component 204 includes receiving user input 208 and the system accepting an on and off signal 210. At 212 information is relayed back to the user. At 214 the system is automatically shut off under excessive heat.

The flow of energy component 202 includes at 218 accepting voltage from a voltage source and, at 220 transporting the energy from the nacelle connection through the hub and into the blade. At 222, electrical energy is converted into heat energy. At 224, energy is transported to the targeted, iced area of the blade. At 226 heat energy is prevented from transferring to parts of the blade where heat is not needed. The flow of energy component 202 also includes transporting lightning strikes to ground at 228 and protecting against energy surges at 230.

While the above description provides examples of one or more apparatus, methods, or systems, it will be appreciated that other apparatus, methods, or systems may be within the scope of the claims as interpreted by one of skill in the art.

The invention claimed is:

1. A system for heating a wind turbine blade, the system comprising:
    a heater for heating air and for attaching to an interior surface of the wind turbine blade;
    a blower for moving air across the heater to generate a heated airflow;
    a flexible duct for receiving the heated airflow and for releasing the heated airflow into the interior of the wind turbine blade; and
    a tip constraint for supporting a distal end of the flexible duct;
    wherein the tip constraint supports the distal end of the flexible duct without attaching to the interior surface of the wind turbine blade.

2. The system of claim 1, wherein the flexible duct comprises a porous fabric duct.

3. The system of claim 2, wherein the flexible duct further comprises a non-porous duct for receiving the heated airflow and passing the heated airflow to the porous fabric duct.

4. The system of claim 3, wherein, the porous fabric duct reduces in diameter in the direction of heated air flow and the non-porous duct does not reduce in diameter.

5. The system of claim 3, wherein the flexible duct is supported by internal pressure provided by the blower.

6. The system of claim 1 further comprising a spine for connecting to and supporting the flexible duct.

7. The system of claim 6, wherein the interior surface of the wind turbine blade includes a spar, and wherein the spine is attached to the spar.

8. The system of claim 1, wherein the tip constraint includes:
    a pair of tip constraint flanges for circumferentially supporting the flexible duct; and
    a plurality of bowing rods affixed at each end to the tip constraint flanges so as to be friction fit with the interior surface of the wind turbine blade.

9. The system of claim 1 further comprising a nozzle attached to the distal end of the flexible duct for passing air to a tip of the wind turbine blade.

10. The system of claim 1 further comprising a temperature sensor for sensing an air temperature of the interior of the wind turbine blade.

11. The system of claim 10 further comprising a control system for adjusting the heater and blower output based on the sensed air temperature.

12. A wind turbine blade including the system of claim 1.

13. A wind turbine including the wind turbine blade of claim 12.

14. A method for heating an interior of a wind turbine blade including installing the system of claim 1 into a wind turbine blade.

15. A method for heating an interior of a wind turbine blade, the method comprising:
    generating heated air in the interior of the wind turbine blade;
    moving the heated air into a porous duct within the interior of the wind turbine blade;
    passing the heated air through the porous duct and into the interior of the wind turbine blade to heat a surface of the wind turbine blade; and
    supporting a distal end of the porous duct with a tip constraint;
    wherein the tip constraint supports the distal end of the porous duct without attaching to the interior surface of the wind turbine blade.

16. The method of claim 15 further comprising melting ice on an exterior surface of the wind turbine blade.

17. The method of claim 15 further comprising heating a leading edge surface of the wind turbine blade.

18. The method of claim 15 further comprising:
    sensing a temperature of the wind turbine blade; and
    adjusting the generated heated air based on the sensed temperature.

19. The method of claim 15 further comprising:
    sensing a pressure of the interior of the wind turbine blade; and
    adjusting the generated heated air based on the sensed pressure.

* * * * *